United States Patent
Kobayashi et al.

(10) Patent No.: US 7,508,819 B2
(45) Date of Patent: Mar. 24, 2009

(54) INTERNET TELEPHONE, SERVER APPARATUS, CALLING METHOD, AND INTERNET TELEPHONE SYSTEM

(75) Inventors: Kazuto Kobayashi, Kanagawa (JP); Akira Miyajima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 609 days.

(21) Appl. No.: 11/082,710

(22) Filed: Mar. 18, 2005

(65) Prior Publication Data

US 2005/0207402 A1 Sep. 22, 2005

(30) Foreign Application Priority Data

Mar. 22, 2004 (JP) ............................ P2004-083209

(51) Int. Cl.
*H04L 12/66* (2006.01)
(52) U.S. Cl. ....................... 370/352; 370/389; 370/392; 379/900
(58) Field of Classification Search .................. 379/900
See application file for complete search history.

(56) References Cited

U.S. PATENT DOCUMENTS

| | | | |
|---|---|---|---|
| 6,442,268 | B1 | 8/2002 | Klaghofer et al. |
| 7,027,582 | B2 * | 4/2006 | Khello et al. .......... 379/220.01 |
| 2004/0003114 | A1 * | 1/2004 | Adamczyk .................. 709/245 |
| 2004/0190711 | A1 | 9/2004 | Miyajima |
| 2005/0182781 | A1 * | 8/2005 | Bouvet ....................... 707/102 |
| 2007/0189500 | A1 * | 8/2007 | Stanford ................. 379/355.01 |

FOREIGN PATENT DOCUMENTS

| | | |
|---|---|---|
| EP | 0967764 | 12/1999 |
| JP | 2001-320485 | 11/2001 |
| JP | 2002-101198 | 4/2002 |

OTHER PUBLICATIONS

U.S. Appl. No. 11/082,795, filed Mar. 18, 2005.
U.S. Appl. No. 11/082,796, filed Mar. 18, 2005.
English Language Abstract of JP-2002-101198.
English Language Abstract of JP-2001-2001-320485.

* cited by examiner

*Primary Examiner*—Duc C Ho
(74) *Attorney, Agent, or Firm*—Greenblum & Bernstein, P.L.C.

(57) ABSTRACT

An Internet telephone system that stores NAPTR resource records which include URIs corresponding to the phone numbers of individual terminals (Internet telephones), as well as IP addresses that correspond to those URIs. The system uses a server that stores a plurality of URIs corresponding to telephone numbers of terminals adjacent to a particular telephone, and uses a terminal that receives, from the sever, URI(s) and other information corresponding to an input telephone number, and places calls to destinations. In the Internet telephone system according to the present invention, the sever returns a plurality of URIs in response to requests, from the terminal, for URIs corresponding to a particular telephone number, and the terminal places a call to a destination corresponding to one of these URIs. When no connection is possible with the destination, a different URI is selected, and another call is placed to a destination corresponding to the different URI.

30 Claims, 29 Drawing Sheets

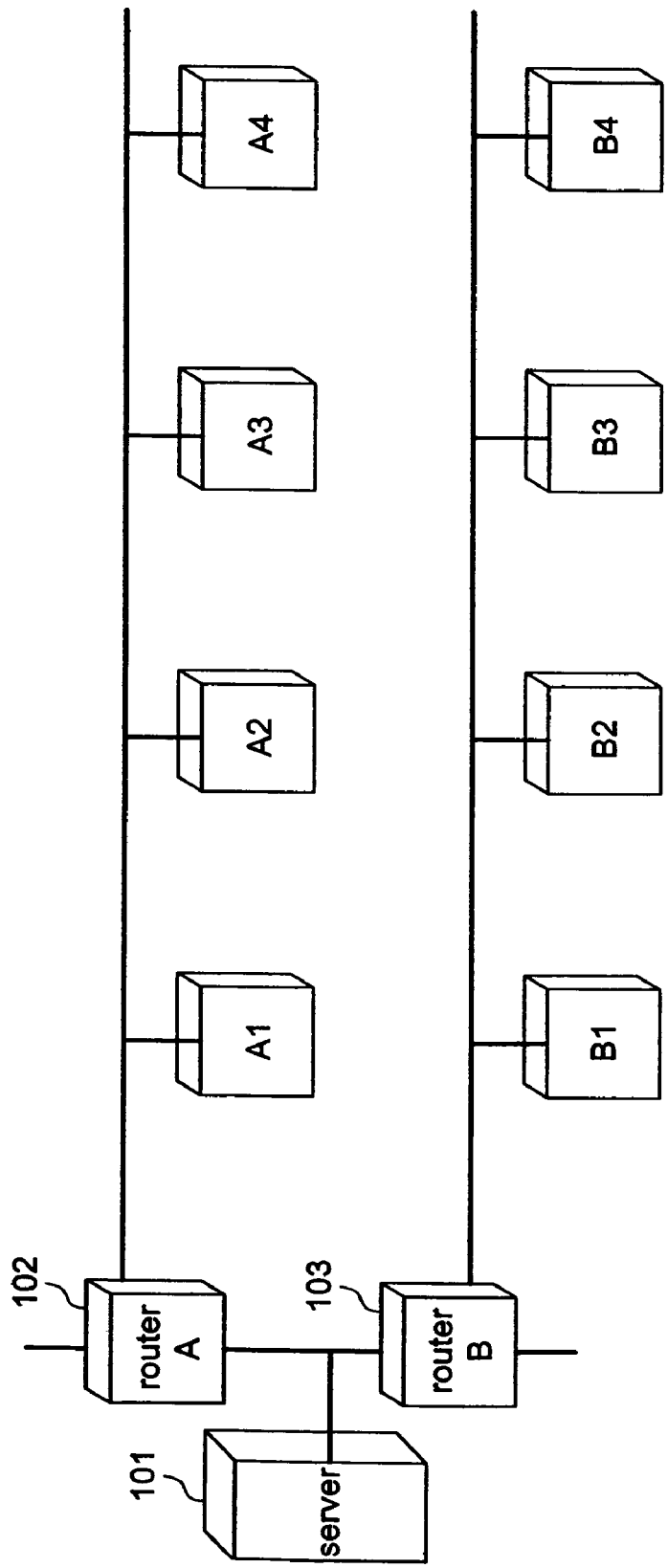

Fig.2(a)

| Terminal | Telephone number | IP address |
|---|---|---|
| A1 | 0310000000(main number) | 192.168.1.1 |
| A2 | 0310000001 | 192.168.1.2 |
| A3 | 0310000002 | 192.168.1.3 |
| A4 | 0310000003 | 192.168.1.4 |

Fig.2(b)

| Terminal | Telephone number | IP address |
|---|---|---|
| B1 | 0310001000(main number) | 192.168.2.1 |
| B2 | 0310001001 | 192.168.2.2 |
| B3 | 0310001002 | 192.168.2.3 |
| B4 | 0310001003 | 192.168.2.4 |

Fig.5(a)

| Enum domain name | | Order | Preference | Flags | Service | | URI scheme |
|---|---|---|---|---|---|---|---|
| | | | | | | | URI |
| 0.0.0.0.0.0.0.1.3.1.8.e164.arpa | IN NAPTR | 100 | 10 | "u" | "E2U+sip" | "!^.*$!sip:" | 81310000000@tokyo.sip.jp |
| | IN NAPTR | 100 | 10 | "u" | "E2U+sip" | "!^.*$!sip:" | 81310000001@tokyo.sip.jp |
| | IN NAPTR | 100 | 10 | "u" | "E2U+sip" | "!^.*$!sip:" | 81310000002@tokyo.sip.jp |
| | IN NAPTR | 100 | 10 | "u" | "E2U+sip" | "!^.*$!sip:" | 81310000003@tokyo.sip.jp |
| 1.0.0.0.0.0.0.1.3.1.8.e164.arpa | IN NAPTR | 100 | 10 | "u" | "E2U+sip" | "!^.*$!sip:" | 81310000001@tokyo.sip.jp |
| 2.0.0.0.0.0.0.1.3.1.8.e164.arpa | IN NAPTR | 100 | 10 | "u" | "E2U+sip" | "!^.*$!sip:" | 81310000002@tokyo.sip.jp |
| 3.0.0.0.0.0.0.1.3.1.8.e164.arpa | IN NAPTR | 100 | 10 | "u" | "E2U+sip" | "!^.*$!sip:" | 81310000003@tokyo.sip.jp |

← NAPTR resource record

Fig.5(b)

| Enum domain name | | Order | Preference | Flags | Service | | URI scheme |
|---|---|---|---|---|---|---|---|
| | | | | | | | URI |
| 0.0.0.1.0.0.0.1.3.1.8.e164.arpa | IN NAPTR | 100 | 10 | "u" | "E2U+sip" | "!^.*$!sip:" | 81310001000@tokyo.sip.jp |
| | IN NAPTR | 100 | 10 | "u" | "E2U+sip" | "!^.*$!sip:" | 81310001001@tokyo.sip.jp |
| | IN NAPTR | 100 | 10 | "u" | "E2U+sip" | "!^.*$!sip:" | 81310001002@tokyo.sip.jp |
| | IN NAPTR | 100 | 10 | "u" | "E2U+sip" | "!^.*$!sip:" | 81310001003@tokyo.sip.jp |
| 1.0.0.1.0.0.0.1.3.1.8.e164.arpa | IN NAPTR | 100 | 10 | "u" | "E2U+sip" | "!^.*$!sip:" | 81310001001@tokyo.sip.jp |
| 2.0.0.1.0.0.0.1.3.1.8.e164.arpa | IN NAPTR | 100 | 10 | "u" | "E2U+sip" | "!^.*$!sip:" | 81310001002@tokyo.sip.jp |
| 3.0.0.1.0.0.0.1.3.1.8.e164.arpa | IN NAPTR | 100 | 10 | "u" | "E2U+sip" | "!^.*$!sip:" | 81310001003@tokyo.sip.jp |

← NAPTR resource record

Fig.6(a)

| URI | IP address |
|---|---|
| 81310000000@tokyo.sip.jp | 192.168.1.1 |
| 81310000001@tokyo.sip.jp | 192.168.1.2 |
| 81310000002@tokyo.sip.jp | 192.168.1.3 |
| 81310000003@tokyo.sip.jp | 192.168.1.4 |

Fig.6(b)

| URI | IP address |
|---|---|
| 81310001000@tokyo.sip.jp | 192.168.2.1 |
| 81310001001@tokyo.sip.jp | 192.168.2.2 |
| 81310001002@tokyo.sip.jp | 192.168.2.3 |
| 81310001003@tokyo.sip.jp | 192.168.2.4 |

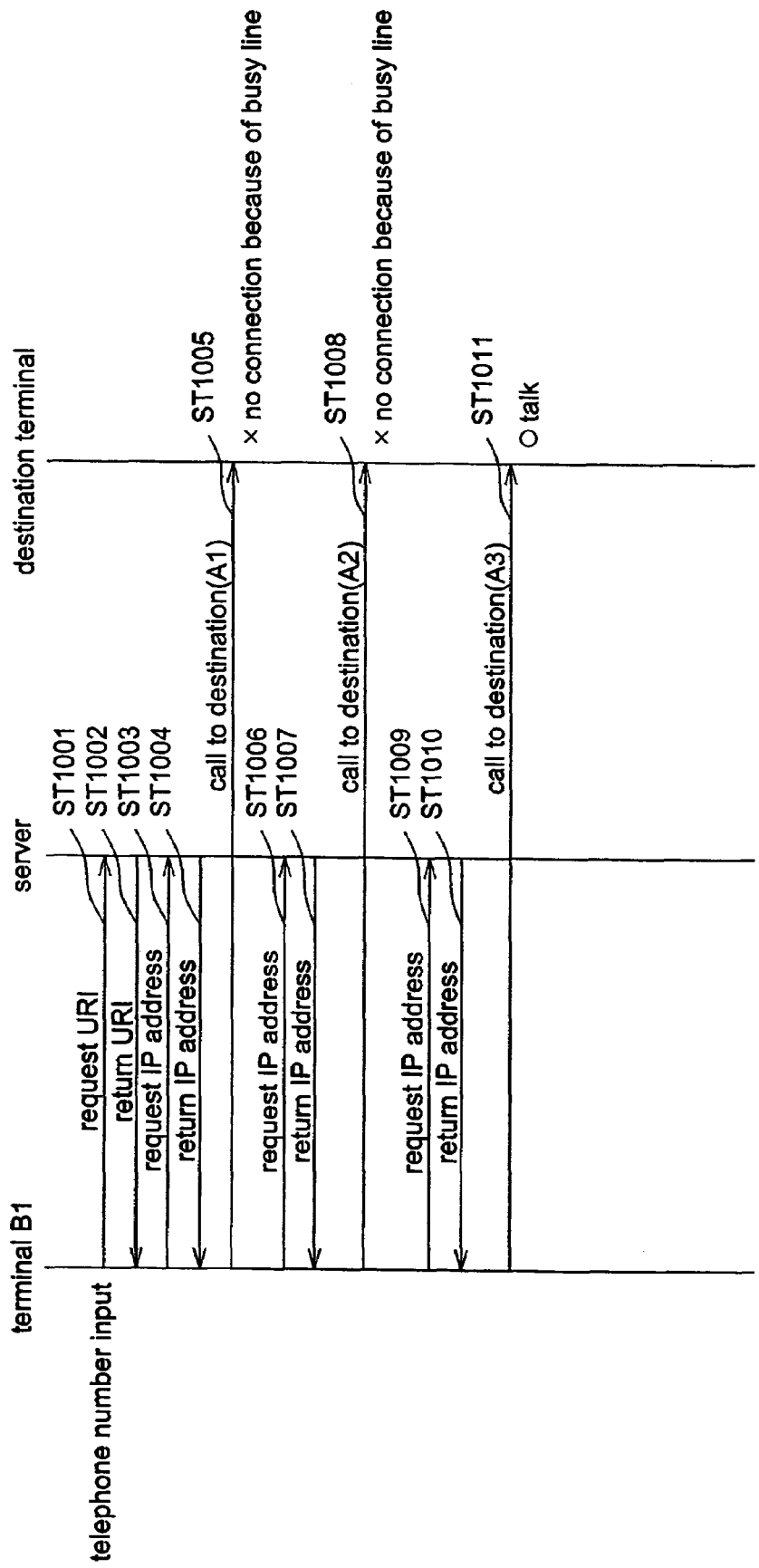

Fig.11

| Enum domain name | | Order | Preference | Flags | Service | | URI scheme |
|---|---|---|---|---|---|---|---|
| | | | | | | | URI |
| 0.0.0.0.0.0.0.1.3.1.8.e164.arpa | IN NAPTR | 100 | 10 | "u" | "E2U+sip" | "!^.*$!sip:" | 81310000000@tokyo.sip.jp " |
| | IN NAPTR | 100 | 20 | "u" | "E2U+sip" | "!^.*$!sip:" | 81310000001@tokyo.sip.jp " |
| | IN NAPTR | 100 | 30 | "u" | "E2U+sip" | "!^.*$!sip:" | 81310000002@tokyo.sip.jp " |
| | IN NAPTR | 100 | 40 | "u" | "E2U+sip" | "!^.*$!sip:" | 81310000003@tokyo.sip.jp " |
| 1.0.0.0.0.0.0.1.3.1.8.e164.arpa | IN NAPTR | 100 | 10 | "u" | "E2U+sip" | "!^.*$!sip:" | 81310000001@tokyo.sip.jp " |
| 2.0.0.0.0.0.0.1.3.1.8.e164.arpa | IN NAPTR | 100 | 10 | "u" | "E2U+sip" | "!^.*$!sip:" | 81310000002@tokyo.sip.jp " |
| 3.0.0.0.0.0.0.1.3.1.8.e164.arpa | IN NAPTR | 100 | 10 | "u" | "E2U+sip" | "!^.*$!sip:" | 81310000003@tokyo.sip.jp " |

← NAPTR resource record

Fig.14

| Enum domain name | | Order | Preference | Flags | Service | | URI scheme | |
|---|---|---|---|---|---|---|---|---|
| | | | | | | | URI | |
| 0.0.0.0.0.0.0.1.3.1.8.e164.arpa | IN NAPTR | 100 | 10 | "u" | "E2U+sip" | "!^.*$!sip: | 81310000000@tokyo.sip.jp" | ← NAPTR resource record |
| | IN NAPTR | 100 | 10 | "u" | "E2U+sip" | "!^.*$!sip: | 81310000001@tokyo.sip.jp" | |
| | IN NAPTR | 100 | 20 | "u" | "E2U+sip" | "!^.*$!sip: | 81310000002@tokyo.sip.jp" | |
| | IN NAPTR | 100 | 20 | "u" | "E2U+sip" | "!^.*$!sip: | 81310000003@tokyo.sip.jp" | |
| 1.0.0.0.0.0.0.1.3.1.8.e164.arpa | IN NAPTR | 100 | 10 | "u" | "E2U+sip" | "!^.*$!sip: | 81310000001@tokyo.sip.jp" | |
| 2.0.0.0.0.0.0.1.3.1.8.e164.arpa | IN NAPTR | 100 | 10 | "u" | "E2U+sip" | "!^.*$!sip: | 81310000002@tokyo.sip.jp" | |
| 3.0.0.0.0.0.0.1.3.1.8.e164.arpa | IN NAPTR | 100 | 10 | "u" | "E2U+sip" | "!^.*$!sip: | 81310000003@tokyo.sip.jp" | |

Fig.15

| Enum domain name | | Order | Preference | Flags | Service | | URI scheme |
|---|---|---|---|---|---|---|---|
| | | | | | | | URI |
| 0.0.0.0.0.0.0.1.3.1.8.e164.arpa | IN NAPTR | 100 | 10 | "u" | "E2U+sip" | "!^.*$!sip:" | 81310000000@tokyo.sip.jp" |
| | IN NAPTR | 100 | 20 | "u" | "E2U+sip" | "!^.*$!sip:" | 81310000001@tokyo.sip.jp" |
| | IN NAPTR | 100 | 30 | "u" | "E2U+sip" | "!^.*$!sip:" | 81310000002@tokyo.sip.jp" |
| | IN NAPTR | 100 | 40 | "u" | "E2U+sip" | "!^.*$!sip:" | 81310000003@tokyo.sip.jp" |
| 1.0.0.0.0.0.0.1.3.1.8.e164.arpa | IN NAPTR | 100 | 10 | "u" | "E2U+sip" | "!^.*$!sip:" | 81310000001@tokyo.sip.jp" |
| 2.0.0.0.0.0.0.1.3.1.8.e164.arpa | IN NAPTR | 100 | 10 | "u" | "E2U+sip" | "!^.*$!sip:" | 81310000002@tokyo.sip.jp" |
| 3.0.0.0.0.0.0.1.3.1.8.e164.arpa | IN NAPTR | 100 | 10 | "u" | "E2U+sip" | "!^.*$!sip:" | 81310000003@tokyo.sip.jp" |
| 4.0.0.0.0.0.0.1.3.1.8.e164.arpa | IN NAPTR | 100 | 10 | "u" | "E2U+sip" | "!^.*$!sip:" | 81310000000@tokyo.sip.jp" |
| | IN NAPTR | 100 | 10 | "u" | "E2U+sip" | "!^.*$!sip:" | 81310000001@tokyo.sip.jp" |
| | IN NAPTR | 100 | 10 | "u" | "E2U+sip" | "!^.*$!sip:" | 81310000002@tokyo.sip.jp" |
| | IN NAPTR | 100 | 10 | "u" | "E2U+sip" | "!^.*$!sip:" | 81310000003@tokyo.sip.jp" |

NAPTR resource record

Fig.16

| Enum domain name | | Order | Preference | Flags | Service | URI scheme | URI |
|---|---|---|---|---|---|---|---|
| 0.0.0.0.0.0.1.3.1.8.e164.arpa | IN NAPTR | 100 | 10 | "u" | "E2U+sip" | "!^.*$!sip:" | 81310000000@tokyo.sip.jp" |
| | IN NAPTR | 100 | 20 | "u" | "E2U+sip" | "!^.*$!sip:" | 81310000001@tokyo.sip.jp" |
| | IN NAPTR | 100 | 30 | "u" | "E2U+sip" | "!^.*$!sip:" | 81310000002@tokyo.sip.jp" |
| | IN NAPTR | 100 | 40 | "u" | "E2U+sip" | "!^.*$!sip:" | 81310000003@tokyo.sip.jp" |
| | IN NAPTR | 100 | 50 | "u" | "E2U+message :mailto" | "!^.*$!mailto:" | info@panasonic.co.jp" |
| | IN NAPTR | 100 | 60 | "u" | "E2U+tel" | "!^.*$!tel:" | +81310000010;SVC=fax" |
| 1.0.0.0.0.0.1.3.1.8.e164.arpa | IN NAPTR | 100 | 10 | "u" | "E2U+sip" | "!^.*$!sip:" | 81310000001@tokyo.sip.jp" |
| 2.0.0.0.0.0.1.3.1.8.e164.arpa | IN NAPTR | 100 | 10 | "u" | "E2U+sip" | "!^.*$!sip:" | 81310000002@tokyo.sip.jp" |
| 3.0.0.0.0.0.1.3.1.8.e164.arpa | IN NAPTR | 100 | 10 | "u" | "E2U+sip" | "!^.*$!sip:" | 81310000003@tokyo.sip.jp" |

NAPTR resource record

Fig.19(a)

| URI | Identification |
|---|---|
| 81310000000@tokyo.sip.jp | Matsushita Tarou |
| 81310000001@tokyo.sip.jp | Matsushita Jirou |
| 81310000002@tokyo.sip.jp | Matsushita Saburou |
| 81310000003@tokyo.sip.jp | Matsushita Hanako |

Fig.19(b)

| URI | Identification |
|---|---|
| 81310001000@tokyo.sip.jp | Matsushita Shirou |
| 81310001001@tokyo.sip.jp | Matsushita Gorou |
| 81310001002@tokyo.sip.jp | Matsushita Kyouko |
| 81310001003@tokyo.sip.jp | Matsushita kaoru |

Fig.23

| Enum domain name | | Order | Preference | Flags | Service | | URI scheme | |
|---|---|---|---|---|---|---|---|---|
| | | | | | | | | URI |
| 0.0.0.0.0.0.1.3.1.8.e164.arpa | IN NAPTR | 100 | 10 | "u" | "E2U+sip" | "!^.*$!sip:" | 81310000000@tokyo.sip.jp:5060" | — NAPTR resource record |
| | IN NAPTR | 100 | 10 | "u" | "E2U+sip" | "!^.*$!sip:" | 81310000000@tokyo.sip.jp:60001" | |
| | IN NAPTR | 100 | 10 | "u" | "E2U+sip" | "!^.*$!sip:" | 81310000000@tokyo.sip.jp:60002" | |
| | IN NAPTR | 100 | 10 | "u" | "E2U+sip" | "!^.*$!sip:" | 81310000000@tokyo.sip.jp:60003" | |
| 1.0.0.0.0.0.0.1.3.1.8.e164.arpa | IN NAPTR | 100 | 10 | "u" | "E2U+sip" | "!^.*$!sip:" | 81310000000@tokyo.sip.jp:60001" | |
| 2.0.0.0.0.0.0.1.3.1.8.e164.arpa | IN NAPTR | 100 | 10 | "u" | "E2U+sip" | "!^.*$!sip:" | 81310000000@tokyo.sip.jp:60002" | |
| 3.0.0.0.0.0.0.1.3.1.8.e164.arpa | IN NAPTR | 100 | 10 | "u" | "E2U+sip" | "!^.*$!sip:" | 81310000000@tokyo.sip.jp:60003" | |

Fig.24

| Port number | Terminal | Private IP address |
|---|---|---|
| 5060 | A1 | 192.168.1.100 |
| 60001 | A2 | 192.168.1.101 |
| 60002 | A3 | 192.168.1.102 |
| 60003 | A4 | 192.168.1.103 |

INTERNET TELEPHONE, SERVER APPARATUS, CALLING METHOD, AND INTERNET TELEPHONE SYSTEM

BACKGROUND OF THE INVENTION

1. Field of the Invention

The present invention relates to an Internet telephone, a server apparatus, and an Internet telephone system that perform a telephone call via the Internet, and relates to a calling method via an Internet network.

2. Description of Related Art

A conventional network that is used by so-called Internet telephone has been configured as follows.

Taking an Internet telephone system using H.323 protocol as an example, a calling management server (known as gatekeeper) is provided within an Internet telephone network. This gatekeeper has functions to receive a destination phone number from each telephone, to convert the phone number into a corresponding IP address, and to return the telephone number back to the originating telephone.

When an operator inputs the desired telephone number, the telephone number is called to the gate keeper. When the telephone receives, from the gatekeeper, an IP address that corresponds to the telephone number, an originating telephone can access, based on the IP address, a destination telephone via the gatekeeper, or directly access the destination telephone without involving the gatekeeper. Accordingly, a telephone call becomes available via the Internet (see Related Art 1).

In addition, a router is normally involved between the gatekeeper and each telephone. A plurality of Internet telephones, configuring a group in a network, are connected to such a router. Telephones within the same group have IP addresses having a common network address. In a normal corporate office setting, telephones within the same department are configured as the same group in the network.

FIG. 28(a) illustrates a network configuration of a general Internet telephone system. In the network shown in FIG. 28(a), router A 2802 and router B 2803 are connected to call management server (server) 2801. Internet telephones A1-A4, configuring group (A), are connected to router A 2802, while Internet telephones B1-B4, configuring group (B) are connected to router B 2803.

FIGS. 28(b) and (c) illustrate management charts that register telephone numbers assigned to each Internet telephone and the corresponding IP addresses. FIGS. 28(b) and (c) respectively illustrate management charts of group (A) and group (B). In this example, telephone numbers are extension numbers used in a corporate office setting.

As shown in FIG. 28(b), telephone numbers 1001-1004 are respectively assigned to Internet telephones (terminals) A1-A4, and have IP addresses of (192. 168. 1. 1)-(192. 168. 1. 4). Network address (192. 168. 1) is commonly used for the above IP addresses of group (A) terminals.

As shown in FIG. 28(c), telephone numbers 2001-2004 are respectively assigned to Internet telephones (terminals) B1-B4, and have IP addresses of (192. 168. 2. 1)-(192. 168. 2. 4). Network address (192. 168. 2) is commonly used for the above IP addresses of group (B) terminals.

[Related Art 1]
Japanese Patent Laid Open Publication 2002-101198 (Pages 4-5, FIG. 1)

The above-described conventional art has the following shortcomings.

In a case where a call is placed to a telephone in a department, and the telephone is busy, the caller needs to hang up the phone and to dial a different number of a telephone adjacent to the busy telephone, if it is for an urgent matter. Therefore, such a calling operation has been very cumbersome to the caller.

The above network configuration is further described using the example of terminal A1 placing a call to terminal B1. FIG. 29 is a sequence diagram illustrating an operation of a conventional Internet telephone system.

As shown in FIG. 29, when terminal A1 places a call to terminal B1, the caller first inputs telephone number (2001) of terminal B1. Upon obtaining the telephone number, terminal A1 transmits, to server 2801, a request for the IP address of terminal B1. Then, server 2801 provides the IP address of terminal B1. Based on the obtained IP address, terminal A1 places a call to terminal B1.

In this example, terminal B1 is busy, thus the connection to terminal B1 is unsuccessful, and terminal A1 receives a busy tone. Upon confirming the busy tone, the caller hangs up the telephone, and inputs telephone number (2002) of terminal B2. In the same process as calling terminal B1, terminal B2 is called when terminal A1 obtains the IP address of terminal B2 from server 2801.

In this example, terminal B2 is also busy, thus the connection to terminal B2 is unsuccessful, and terminal A1 receives a busy tone. Upon confirming the busy tone, the caller hangs up the telephone, and inputs telephone number (2003) of an adjacent terminal B3. In the same process as calling terminal B1 and terminal B2, terminal B3 is called when terminal A1 obtains the IP address of terminal B3 from server 2801.

In this example, terminal B3 is not busy, thus the connection between terminal A1 and terminal B3 is successful. Then, a message to the operator of terminal B1 is delivered to the operator of terminal B3. As described above, when one terminal in a department is busy, the operator needs to dial a different number of an adjacent terminal.

SUMMARY OF THE INVENTION

The present invention is provided to address the above-described problems. The purpose of the invention is to provide an Internet telephone, a network server, a calling method, and an Internet telephone system that automatically redial a different number within the same network group, in a case where a destination telephone line is unavailable.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 1 illustrates a configuration of a network that connects Internet telephones according to the first embodiment of the present invention;

FIG. 2 illustrates charts describing the telephone numbers and IP addresses assigned to the Internet telephones connected to the network shown in FIG. 1;

FIG. 5 illustrates an example of the NAPTR resource record stored in a memory of the server according to the first embodiment of the present invention;

FIG. 6 illustrates charts describing examples of URIs and their corresponding IP addresses stored in the memory of the server according to the first embodiment of the present invention;

FIG. 10 illustrates a sequence diagram describing the group calling process performed between terminal B1 and a terminal within group (A);

FIG. 11 illustrates an example of the NAPTR resource record stored in the memory of the server according to the second embodiment of the present invention;

FIG. 14 illustrates a variant example of the NAPTR resource record stored in the memory of the server according to the second embodiment of the present invention;

FIG. 15 illustrates a variant example of the NAPTR resource record stored in the memory of the server according to the second embodiment of the present invention;

FIG. 16 illustrates an example of the NAPTR resource record stored in the memory of the server according to the third embodiment of the present invention;

FIG. 19 illustrates an example of identifications stored in the memory of the server according to the fourth embodiment of the present invention;

FIG. 23 illustrates an example of the NAPTR resource record stored in the memory of the server according to the fifth embodiment of the present invention;

FIG. 24 illustrates a contract chart describing specific port numbers and IP addresses stored in NAT router according to the fifth embodiment of the present invention;

DETAILED DESCRIPTION OF PREFERRED EMBODIMENTS

The embodiments of the present invention are explained in the following, with reference to the drawings.

First Embodiment

FIG. 1 illustrates a configuration of a network that connects Internet telephones according to the first embodiment of the present invention. In the network shown in FIG. 1, router A102 and router B103 are connected to a call management server (hereafter referred to as "server") 101. Internet telephones A1-A4 configuring group (A) are connected to router A102, while Internet telephones B1-B4 configuring group (B) are connected to router B103. Each group within the network of FIG. 1 can be considered as a department of a corporation. The setting of the Internet telephones in a department is illustrated in FIG. 1.

Although FIG. 1 illustrates a situation where Internet telephones are connected to a router, the configuration can be made such that each ordinary telephone (without the Internet telephone functions) is connected to a control apparatus that facilitates the Internet telephone functions (hereafter referred to as "control adaptor"). In the following illustrations, ordinary telephones are connected to such a control adaptor in order to function as Internet telephones.

FIG. 2 illustrates charts describing the telephone numbers and IP addresses assigned to the Internet telephones connected to the network shown in FIG. 1. FIG. 2(a) shows the telephone numbers and IP addresses assigned to the Internet telephones configuring group (A). FIG. 2(b) shows the telephone numbers and IP addresses assigned to the Internet telephones configuring group (B).

As shown in FIG. 2(a), Internet telephones (terminals) A1-A4 respectively have assigned telephone numbers 0310000000-0310000003 and IP addresses 192.168.1.1-192.168.1.4. Further, as shown in FIG. 2(b), Internet telephones (terminals) B1-B4 respectively have assigned telephone numbers 0310001000-0310001003 and IP addresses 192.168.2.1.-192.168.2.4. In addition, telephone numbers assigned to terminal A1 and terminal B1 are main numbers of group (A) and group (B) respectively.

Figure 3:
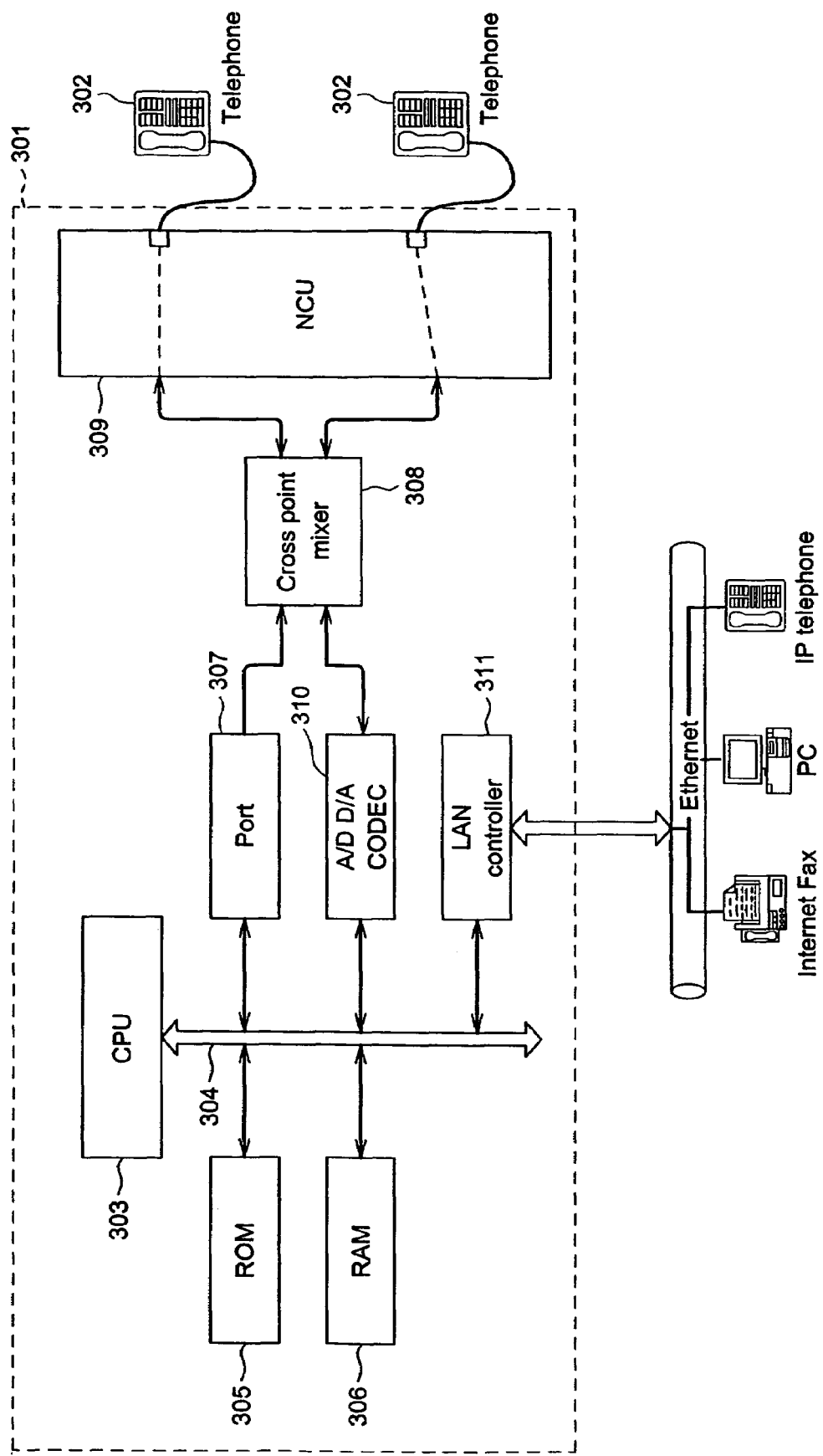
FIG. 3 illustrates, in a block diagram fashion, a configuration of the Internet telephone according to the first embodiment of the present invention.

FIG. 3 is a block diagram illustrating a configuration of the Internet telephone according to the first embodiment of the present invention.

As shown in FIG. 3, the Internet telephone according to the present embodiment is configured to connect ordinary telephone 302 with control adaptor 301. Control adaptor 301 according to the present invention can connect two ordinary telephones 302 in order to facilitate each telephone to function as an Internet telephone. Certainly, a configuration can also be made such that more than three telephones can be connected to control adaptor 301.

Control adaptor 301 is provided with CPU 303 that controls the entire operation of the Internet telephone. ROM 305 and RAM 306 are connected to CPU 303 via control bus 304. ROM 305 stores a control program for control adaptor 301. CPU 303 retrieves and executes the control program. RAM 306 functions as a work memory when CPU 303 executes the control program. In control adaptor 301, a flash ROM is used as ROM 305, while an SDRAM is used as RAM 306.

Crosspoint mixer 308 is also connected to CPU 303 via port 307. Crosspoint mixer 308 has switching and mixing functions of talk lines for the two telephones connected via an NCU (Network Control Unit), which is later described.

NCU 309 is connected to crosspoint mixer 308. NCU 309 controls telephone lines connected to control adaptor 301 and connects/cuts a line to an opposing side.

Further, A/D•D/ACODEC 310 and LAN controller 311 are connected to CPU 303 via control bus 304. A/D•D/ACODEC 310 performs an analog/digital conversion of voice data, which is input from telephone 302, and compresses the converted data. A/D•D/ACODEC 310 also receives the compressed data via LAN controller 311, decompresses the data, and performs the digital/analog conversion.

LAN controller 311 controls signals exchanged with an Ethernet (R) that configures the network to which control adaptor 301 is connected. LAN controller 311 also assembles and analyses packet data transmitted on the network.

When an Internet telephone is used for the above configuration, instead of connecting an ordinary telephone to control adaptor 301, a control board having a function of control adaptor 301 is installed to an Internet telephone.

Figure 4:
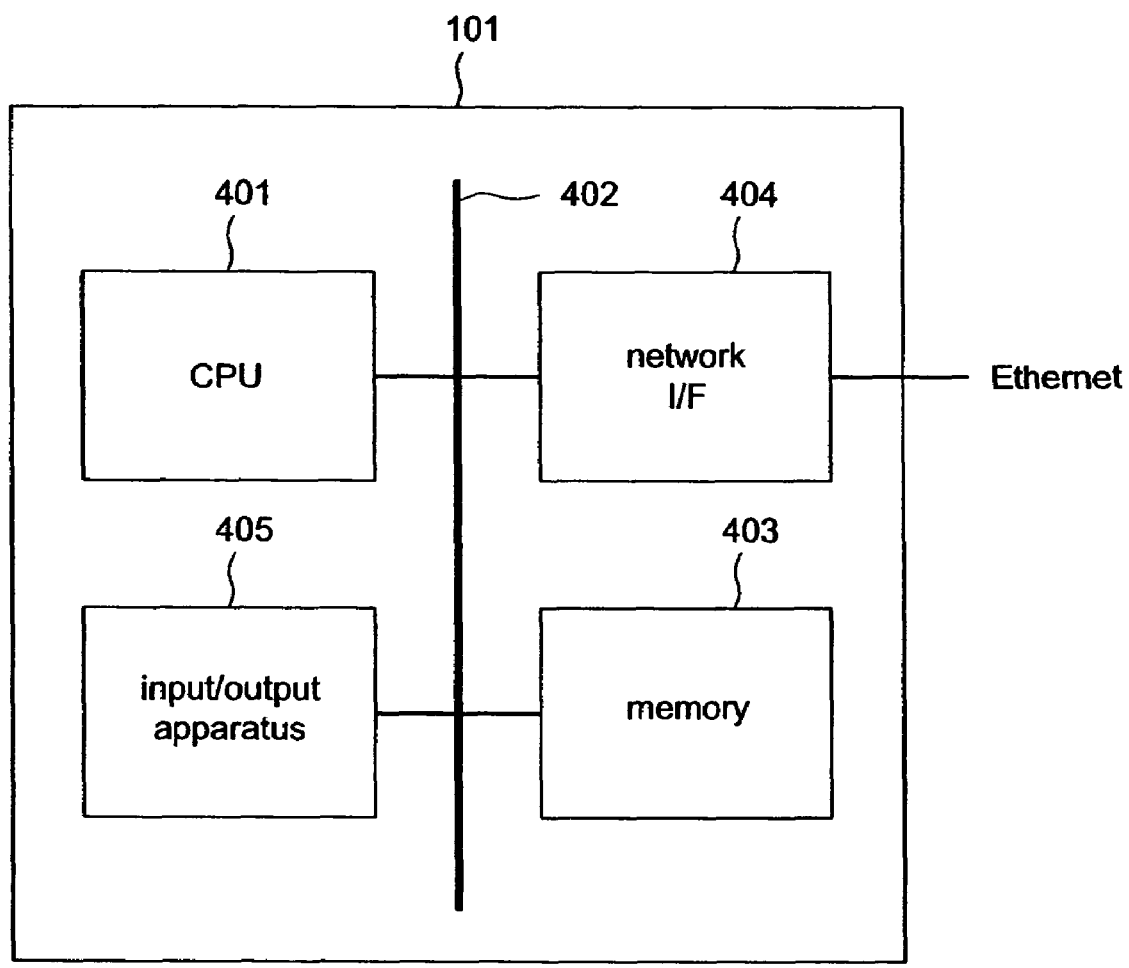
FIG. 4 illustrates, in a block diagram fashion, a general configuration of a server according to the first embodiment of the present invention.

FIG. 4 is a block diagram illustrating a general configuration of server 101 according to the first embodiment of the present invention. Server 101 according to the first embodiment has a function of a DNS (Domain Name System) server that provides an IP address in response to a request for a host name. Especially, in this embodiment, server 101 has a function of an ENUM (Telephone Number Mapping) server that employs the ENUM technology which specifies a host name with a telephone number.

As shown in FIG. 4, server 101 according to the first embodiment of the present invention includes CPU 401 that controls the entire operation of server 101. Memory 403, network interface (I/F) 404, and input/output apparatus 405 are connected to CPU 401 via control bus 402.

Memory 403 has a function of a ROM that stores a control program for server 101. CPU 401 retrieves and executes the control program. Memory 403 also has a function of a RAM that functions as a work memory when CPU 401 executes the control program.

Memory 403 stores a database necessary to convert the assigned telephone numbers into URIs (Uniform Resource Identifier). Data are described as a resource record called NAPTR (The Naming Authority Pointer) (hereafter referred to as NAPTR resource record). NAPTR resource record describes a single or a plurality of NAPTR resource records. Memory 403 stores IP addresses corresponding to URIs converted from telephone numbers.

Network I/F 404 controls signals exchanged with the Ethernet, the Ethernet configuring the network to which server 101 is connected. Input/output apparatus 405 includes an input device such as a keyboard and a mouse, and an output device such as a liquid crystal display monitor. Input/output apparatus 405 receives an input from an operator, while outputting a status of an operation at server 101.

FIG. 5 illustrates an example of the NAPTR resource record stored in memory 403 of server 101 according to the first embodiment of the present invention. FIG. 5(a) shows the NAPTR resource record corresponding to group (A) shown in FIG. 1, while FIG. 5(b) shows the NAPTR resource record corresponding to group (B) shown in FIG. 1.

As shown in FIG. 5(a), four URIs (81310000000@tokyo.sip.jp), (81310000001@tokyo.sip.jp), (81310000002@tokyo.sip.jp) and (81310000003@tokyo.sip.jp) correspond to domain name (0.0.0.0.0.0.0.1.3.1.8.e164.arpa) obtained from the main telephone number of terminal A1 (0310000000). Similarly, URIs (81310000001@tokyo.sip.jp), (81310000002@tokyo.sip.jp) and (81310000003@tokyo.sip.jp) are respectively corresponded to domain name (1.0.0.0.0.0.0.1.3.1.8.e164.arpa), (2.0.0.0.0.0.0.1.3.1.8.e164.arpa) and (3.0.0.0.0.0.0.1.3.1.8.e164.arpa) obtained respectively from the telephone numbers of terminal A2 (0310000001), terminal A3 (0310000002) and terminal A4 (0310000003). As described above, the domain name obtained from the telephone number of terminal A1 has the corresponding URI of terminal A1, as well as the corresponding URIs of terminal A2, A3 and A4.

As shown in FIG. 5(b), four URIs (81310001000@tokyo.sip.jp), (81310001001@tokyo.sip.jp), (81310001002@tokyo.sip.jp) and (81310001003@tokyo.sip.jp) correspond to domain name (0.0.0.1.0.0.0.1.3.1.8.e164.arpa) obtained from the main telephone number of terminal B1 (0310010000). Similarly, URIs (81310001001@tokyo.sip.jp), (81310001002@tokyo.sip.jp) and (81310001003@tokyo.sip.jp) are respectively corresponded to domain name (1.0.0.1.0.0.0.1.3.1.8.e164.arpa), (2.0.0.1.0.0.0.1.3.1.8.e164.arpa) and (3.0.0.1.0.0.0.1.3.1.8.e164.arpa) obtained respectively from the telephone numbers of terminal B2 (0310001001), terminal B3 (0310001002) and terminal B4 (0310001003). Similar to FIG. 5(a), the domain name obtained from the telephone number of terminal B1 has the corresponding URI of terminal B1, as well as the corresponding URIs of terminal B2, B3 and B4.

FIG. 6 illustrates charts describing examples of URIs and their corresponding IP addresses stored in memory 403 of server 101 according to the first embodiment of the present invention. FIG. 6(a) shows the URIs and IP addresses that correspond to group (A) shown in FIG. 1. FIG. 6(b) shows the URIs and IP addresses that correspond to group (B) shown in FIG. 1.

As shown in FIG. 6(a), URIs (81310000000@tokyo.sip.jp), (81310000001@tokyo.sip.jp), (81310000002@tokyo.sip.jp) and (81310000003@tokyo.sip.jp) respectively correspond to IP addresses (192.168.1.1), (192.168.1.2), (192.168.1.3) and (192.168.1.4).

As shown in FIG. 6(b), URIs (81310001000@tokyo.sip.jp), (81310001001@tokyo.sip.jp), (81310001002@tokyo.sip.jp) and (81310001003@tokyo.sip.jp) respectively correspond to IP addresses (192.168.2.1), (192.168.2.2), (192.168.2.3) and (192.168.2.4).

Figure 7:
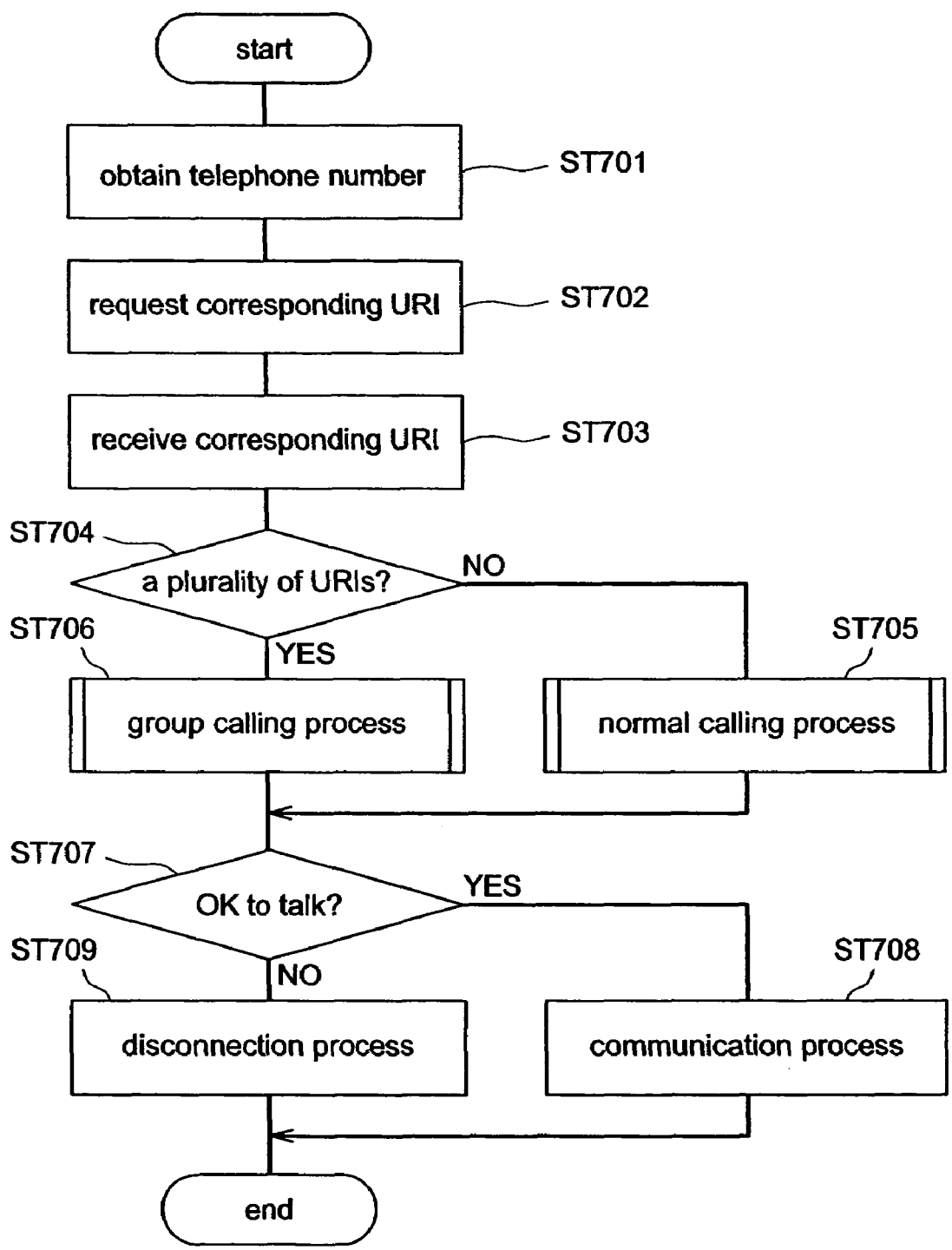
FIG. 7 illustrates a flow chart describing a calling process performed between the Internet telephones connected to the server according to the first embodiment of the present invention.

In the following, a calling process between the Internet telephones connected to sever 101 that comprises the above-described embodiment is described with reference to FIG. 7. Especially, a calling process from terminal B1 to a terminal within group (A) is described. The contrast charts shown in FIG. 6 and the NAPTR resource record shown in FIG. 5 are stored in Memory 403 of server 101.

When placing a call to a terminal within group (A), terminal B1 obtains one of the input telephone numbers of terminals A1-A4 from the operator of terminal B1 (ST 701). For example, when placing a call to terminal A1, "0310000000" or "10000000" with "03 " ("03" means the area code for Tokyo) omitted is input by the operator.

Upon obtaining the input telephone number, terminal B1 transmits, to server 101, a request for URI(s) that correspond(s) to the telephone number (ST 702). In the above example, terminal B1 converts the operator's input number "0310000000" into "+81-3-1-10000000" including the country code according to standard E. 164. Then, "+81310000000" is obtained, with + at the beginning, followed by the numbers. Then, non numerical symbols are deleted, and dots are inserted between the numbers, resulting in "8.1.3.1.0.0.0.0.0.0.0". Finally, the numbers are reversed, and a data string e164.arpa is added at the end, obtaining domain name "0.0.0.0.0.0.0.1.3.1.8.e164.arpa". Terminal B1 then transmits, to server 101, a request for URI(s) that correspond(s) to the data string.

Upon receiving the URI request, server 101 returns corresponding URI (s). according to the NAPTR resource record stored in memory 403, and terminal B1 receives the URI(s) (ST 703). In the above-noted example, four URIs corresponding to the above-noted data string, "81310000000@tokyo.sip.jp", "81310000001@tokyo.sip.jp", "81310000002@tokyo.sip.jp" and "81310000003@tokyo.sip.jp" are returned.

Upon receiving URI(s), terminal B1 determines whether there are a plurality of URIs (ST 704) in order to determine whether to perform a normal calling process or a group calling process, which is later described.

When there are not a plurality of URIs, in other words, when only one URI is received, the normal calling process starts at ST 705. On the other hand, when there are a plurality of URIs, in other words, when a plurality of URIs are received, the group calling process starts at ST 706. In the normal calling process, a call is placed to a single destination, while in the group calling process, calls are placed to a plurality of destinations. In the above-noted example, the group calling process is performed since there are four URIs. A detailed description of the normal calling process and the group calling process is provided later.

After the normal calling process or the group calling process is performed, terminal B1 determines whether the result of a call (hereafter referred to as "calling result") is "OK to talk". There are at least three kinds of calling result: "OK to talk", "not OK to talk" and "waiting". One of the results is stored in a predetermined area on RAM 306.

When the calling result is "OK to talk", a communication process starts at ST 708. On the other hand, when the calling result is other than "OK to talk", a disconnection process starts at ST 709. In the communication process, the calling process performed by terminal B1 is completed when the communication between the operator of terminal B1 and the operator of the destination is finished. In the disconnection process, the calling process is terminated after proceeding to the disconnection process.

Figure 8:
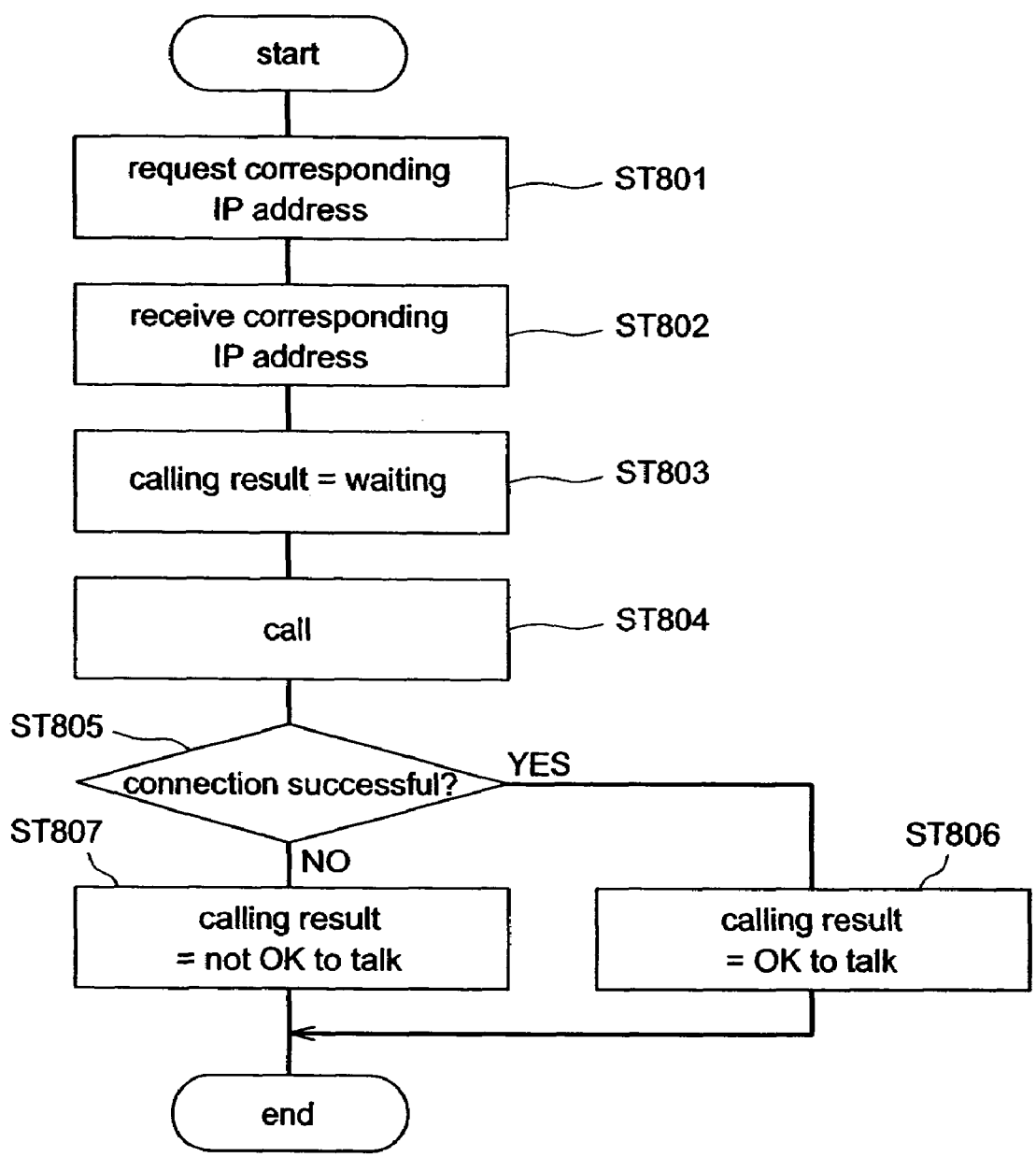
FIG. 8 illustrates a flow chart describing the normal calling process according to the first embodiment of the present invention.

In the following, the normal calling process according to the first embodiment of the present invention is described with reference to FIG. 8. FIG. 8 is a flow chart describing the normal calling process according to the first embodiment of the present invention.

In the normal calling process, terminal B1 transmits, to server 101, a request for an IP address that corresponds to the received URI (ST 801). For example, when URI "81310000001@tokyo.sip.jp" is received, terminal B1 transmits, to server 101, a request for the IP address that corresponds to the URI.

Upon receiving the IP request, server 101 returns a corresponding IP address according to the contract chart stored in memory 403, and terminal B1 receives the IP address (ST 802). In the above-noted example, server 101 returns IP address "192.168.1.2" according to the contract chart shown in FIG. 6(a).

Upon receiving the IP address, terminal B1 initializes the calling result (ST 803). More specifically, terminal B1 initializes the calling result by setting it to "waiting".

Next, terminal B1 places a call to the received IP address (ST 804). In the above-noted example, a call is placed to "192.168.1.2", performing the calling process to terminal A2.

After the calling process is performed, terminal B1 determines whether terminal B1 has been successfully connected to the destination (ST 805). When the connection has been successful, terminal B1 switches the calling result to "OK to talk" (ST 806) and terminates the normal calling process. On the other hand, when terminal B1 has not been successfully connected to the destination, terminal B1 switched the calling result to "not OK to talk" (ST 807) and terminates the normal calling process. Accordingly, in the normal calling process, a call is placed to a single destination, and the calling result changes according to whether terminal B1 has been successfully connected to the destination.

When terminal B1 has not been successfully connected to the destination, the reason includes cases where the line is busy, or the operator of the destination is not available and there is no response over a predetermined time (in case of no response). In case of no response, and when the destination outputs a signal representing a ring back tone continuously for the predetermined time as counted by the timer, it is usually determined that no connection is possible.

Figure 9:
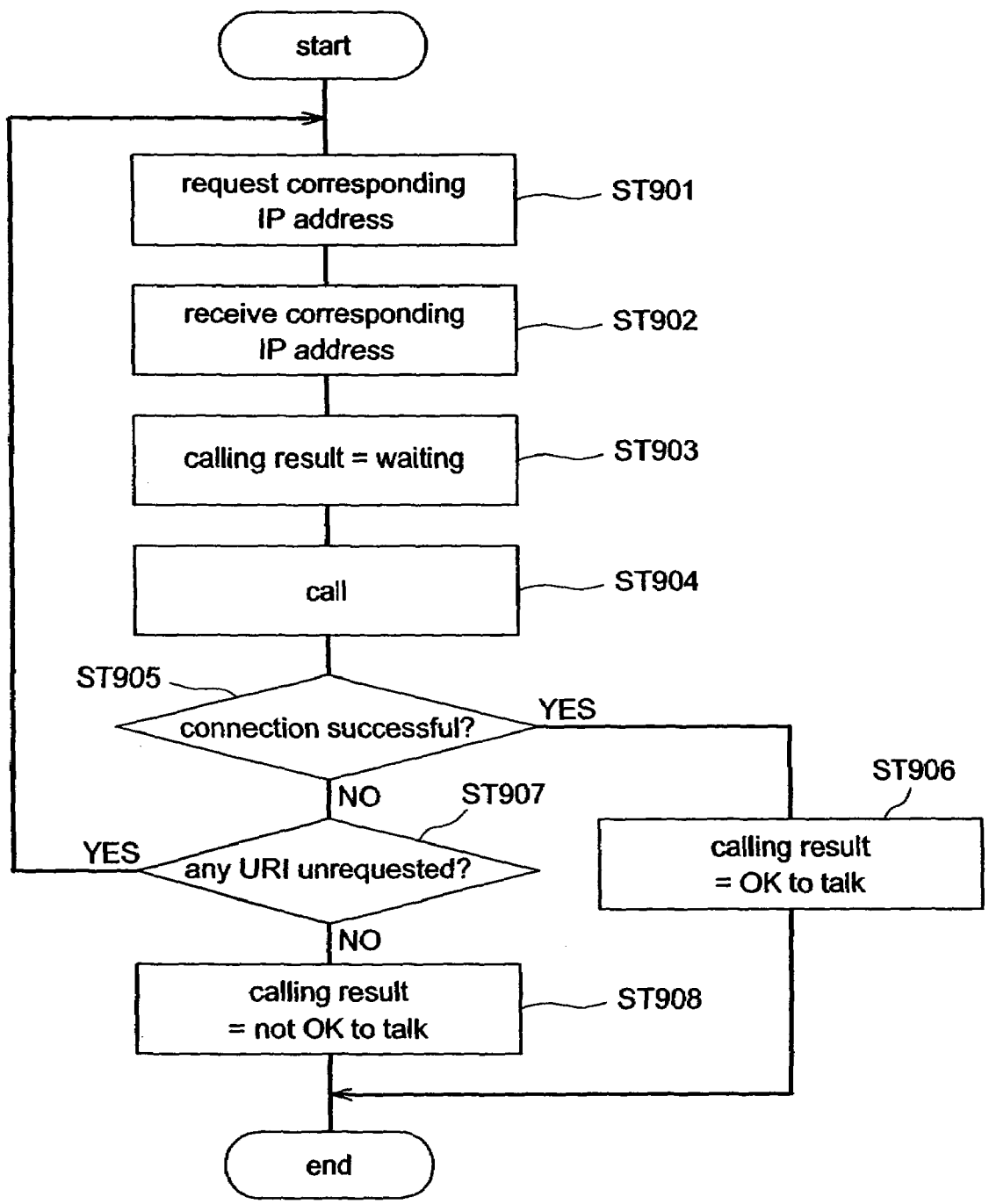
FIG. 9 illustrates a flow chart describing the group calling process according to the first embodiment of the present invention.

Next, the group calling process according to the first embodiment of the present invention is described with reference to FIG. 9. FIG. 9 is a flow chart describing the group calling process according to the first embodiment of the present invention.

In the group calling process, terminal B1 transmits, to server 101, requests for IP addresses that correspond to the received URIs (ST 901). In the group calling process, a plurality of URIs are received, thus terminal B1 transmits, to server 101, a request for an IP address that corresponds to one of these URIs. For example, when URIs "81310000000@tokyo.sip.jp", "81310000001@tokyo.sip.jp", "81310000002@tokyo.sip.jp" and "81310000003@tokyo.sip.jp" are received, terminal B1 transmits, to server 101, a request for an IP address that corresponds to one of these URIs.

Upon receiving the IP address request, server 101 returns a corresponding IP address in the same way as described in the normal calling process, and terminal B1 receives the IP address (ST 902). Upon receiving the IP address, terminal B1 initializes the calling result (ST 903) and places a call to the IP address (ST 904). Terminal B1 then determines whether terminal B1 has been successfully connected to the destination (ST 905). When the connection has been successful, terminal B1 switches the calling result to "OK to talk" (ST 906) and terminates the group calling process.

On the other hand, when terminal B1 has not been successfully connected to the destination, terminal B1 determines whether there is any URI with an IP address that has not been requested (ST 907). When such a URI exists, terminal B1 returns the process to ST 901 and repeats ST 901-ST 907 until IP addresses corresponding to all URIs have been requested. When four URIs are received, ST 901-ST 907 are repeated up to four times.

After IP addresses corresponding to all URIs have been tried while repeating ST 901-ST 907, terminal B1 switches the calling result to "not OK to talk" (ST 908) and terminates the group calling process. Accordingly, in the group calling process, calls are placed to a plurality of destinations. When terminal B1 has not been successfully connected to any of the destinations, terminal B1 sets the calling result to "not OK to talk".

In this example, URIs can be randomly selected for their corresponding IP addresses with no particular priority. After IP addresses corresponding to all URIs have been tried, the calling result is switched to "not OK to talk" (ST 908).

In the following, the group calling process between terminal B1 and a terminal within group (A) is described with reference to FIG. 10. FIG. 10 is a sequence diagram illustrating a situation where terminal B1 places a call to the main telephone number "0310000000" assigned to terminal A1.

Upon obtaining input telephone number "0310000000" from the operator of terminal B1, terminal B1 requests URIs that correspond to the telephone number (ST 1001). In response, terminal B1 receives, from server 101, URIs that correspond to the telephone number (ST 1002). In this example, terminal B1 receives four URIs "813100000000@tokyo.sip.jp", "81310000001@tokyo.sip.jp", "81310000002@tokyo.sip.jp" and "81310000003@tokyo.sip.jp".

Next, terminal B1 transmits, to server 101, a request for an IP address that corresponds to one of these URIs (ST 1003) and receives an IP address that corresponds to the specified URI (ST 1004). In this example, terminal B1 requests the IP address that corresponds to URI "81310000000@tokyo.sip.jp" and receives IP address "192.168.1.1". Upon receiving the IP address, terminal B1 places a call to the IP address (ST 1005), performing the calling process to terminal A1.

In this example, terminal B1 has not been successfully connected to terminal A1 because of a busy line or other reasons. In such a case, terminal B1 requests an IP address that corresponds to a URI other than the one with the IP address that has been requested (ST 1006) and receives, from server 101, an IP address that corresponds to the specified URI (ST 1007). In this example, terminal B1 requests the IP address that corresponds to URI "81310000001@tokyo.sip.jp" and receives IP address "192.168.1.2". Upon receiving the IP address, terminal B1 places a call to the IP address (ST 1008), performing the calling process to terminal A2.

In this example, terminal B1 has not been successfully connected to terminal A2 because of a busy line or other reasons. In such a case, terminal B1 requests an IP address that corresponds to a URI other than those with the IP addresses that have been requested (ST 1009) and receives, from server 101, an IP address that corresponds to the specified URI (ST 1010). In this example, terminal B1 requests the IP address that corresponds to URI "81310000002@tokyo.sip.jp" and receives IP address "192.168.1.3". Upon receiving the IP address, terminal B1 places a call to the IP address (ST 1011), performing the calling process to terminal A3.

In this example, terminal B1 has no connection problems such as a busy line, and has been successfully connected to terminal A3. Therefore, terminal B1 becomes able to talk with the operator of terminal A3. In this example, the IP addresses that correspond to the URIs are requested in the order of terminal A1, terminal A2 and terminal A3. However, this is just one example, and the process can be performed in any other order.

As described above, in the Internet telephone system according to the first embodiment of the present invention, when terminal B1 has not been successfully connected to a destination that corresponds to one of a plurality of URIs received from server 101, a different URI is selected, and another call is placed to a destination that corresponds to the different URI. Accordingly, the operator only needs to input one telephone number. Even when no connection can be established with the destination, additional calls are automatically and sequentially placed to different destinations within the same group. Therefore, the operator does not have to go through the trouble of hanging up the phone and inputting different telephone numbers adjacent to the initial telephone number. This can save significant time and effort during the calling process, especially when no connection can be established with a plurality of telephones.

Particularly, in the Internet telephone system according to the first embodiment of the present invention, when the destination telephone line is busy or there is continuously no response over a predetermined time, a different URI is selected, and another call is placed to a destination that corresponds to the different URI. Therefore, the operator does not have to go through the trouble of hanging up the phone and inputting different telephone numbers adjacent to the initial telephone number. This can save significant time and effort during the calling process. The same effect can be expected for the below-described embodiment of the present invention.

Second Embodiment

In the Internet telephone system according to the first embodiment of the present invention, when a plurality of URIs are received from server 101, URIs are randomly selected, and their corresponding IP addresses are requested. Then a call is placed to a destination that corresponds to the specified IP address. On the other hand, the Internet telephone according to the second embodiment of the present invention sets a priority for selecting URIs, requests a corresponding IP address based on the priority and places a call to a destination that corresponds to the specified IP address.

The Internet telephone according to the second embodiment of the present invention uses preference field value (hereafter referred to as "preference value") stored in the NAPTR resource record. The preference value is used as a parameter to determine a priority for selecting URIs. The preference value serves to determine the order of calls when there are a plurality of NAPTR resource records having the same value in the order field. The Internet telephone according to the second embodiment of the present invention uses the preference value as a parameter to determine a priority for selecting URIs so that calls are placed to a plurality of destinations based on the priority.

FIG. 11 is a chart illustrating an example of the NAPTR resource record stored in memory 403 of server 101 according to the second embodiment of the present invention. FIG. 11 shows the NAPTR resource record corresponding to group (A) shown in FIG. 1.

The NAPTR resource record described in FIG. 11 is the same as described in FIG. 5(*a*) expect the preference value; therefore, a detailed description is omitted. The NAPTR resource record shown in FIG. 11 is different from the NAPTR resource record shown in FIG. 5(a) in that different preference values are set in the NAPTR resource record shown in FIG. 11.

In FIG. 11, four URIs correspond to domain name "0.0.0.0.0.0.0.1.3.1.8.e164.arpa" obtained from the main telephone number of terminal A1 "0310000000". Of the NAPTR resource records including these URIs, the NAPTR resource record including "81310000000@tokyo.sip.jp" has a preference value of "10", and the NAPTR resource record including "81310000001@tokyo.sip.jp" has a preference value of "20". Similarly, the NAPTR resource record including "81310000002@tokyo.sip.jp" has a preference value of "30", and the NAPTR resource record including "81310000003@tokyo.sip.jp" has a preference value of "40".

Figure 12:
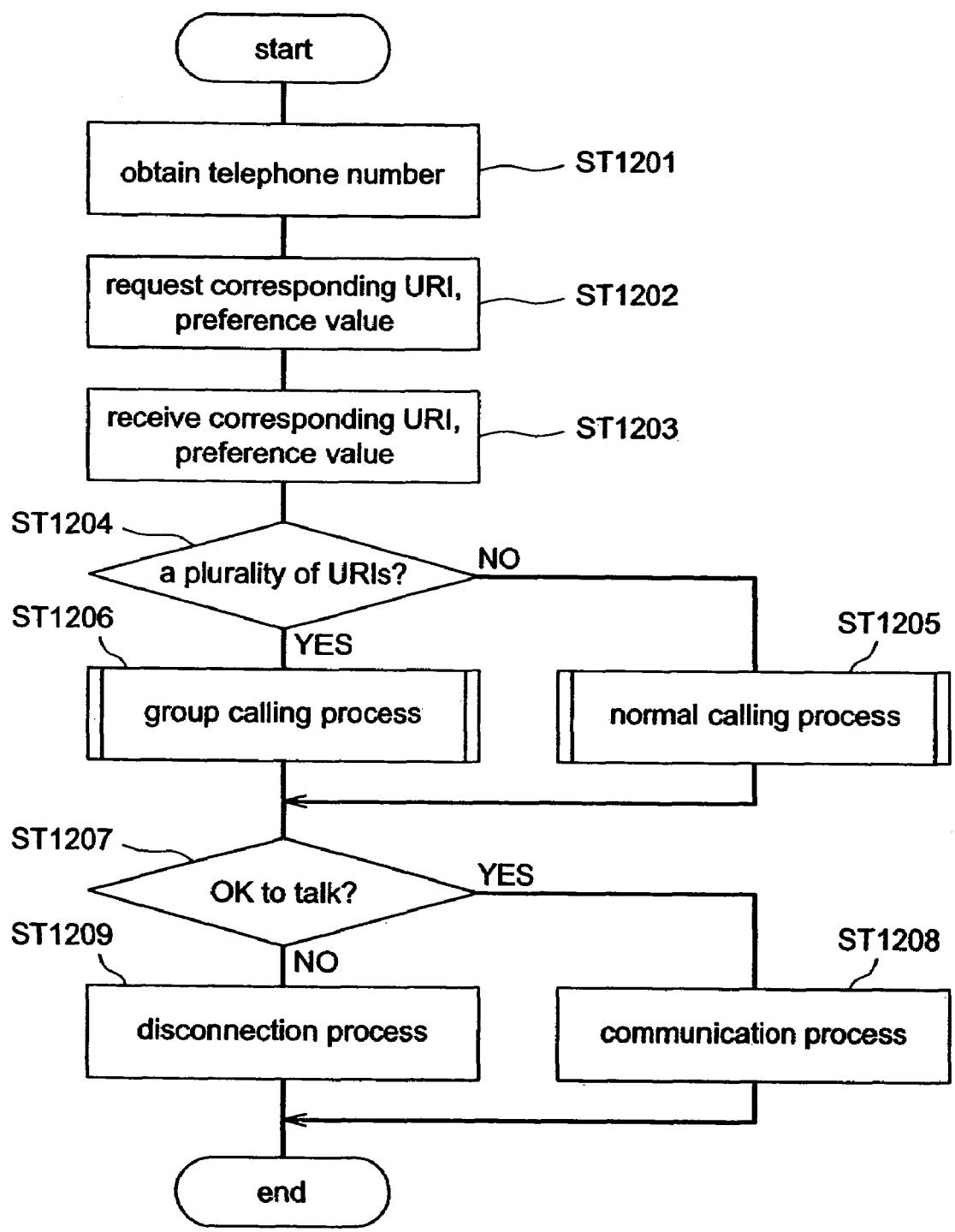
FIG. 12 illustrates a flow chart describing the calling process between the Internet telephones connected to the server according to the second embodiment of the present invention.

In the following, the calling process between the Internet telephones connected to server 101 comprising the above-described embodiment is described with reference to FIG. 12. Particularly, the calling process from terminal B1 to a terminal within group (A) is described. Information described in FIG. 11 and FIG. 6 is stored in Memory 403 of server 101.

When placing a call to a terminal within group (A), terminal B1 obtains one of the input telephone numbers of terminals A1-A4 from the operator (ST 1201). For example, when placing a call to terminal A1, terminal B1 obtains "0310000000" or "10000000" with "03" omitted from the operator.

Upon obtaining the input telephone number, terminal B1 transmits, to server 101, a request for URI(s) and preference value(s) that correspond to the telephone number (ST 1202). In the above-noted example, terminal B1 obtains a data string "0.0.0.0.0.0.0.1.3.1.8.e164.arpa" from telephone number "0310000000(10000000)". Terminal B1 then requests URI(s) and preference value(s) that correspond to the data string.

Upon receiving the request for URI(s) and preference value(s), server 101 returns corresponding URI(s) and preference value(s) according to the NAPTR resource record stored in memory 403, and terminal B1 receives the URI(s) and the preference value(s) (ST 1203). In the above-noted example, server 101 returns four URIs and four preference values that correspond to the data string according to the NAPTR resource record shown in FIG. 11. More specifically, "81310000000@tokyo.sip.jp" and "10"; "81310000001@tokyo.sip.jp" and "20"; "81310000002@tokyo.sip.jp" and "30"; and "81310000003@tokyo.sip.jp" and "40" are returned.

Upon receiving URI(s) and other information, terminal B1 determines whether there are a plurality of URIs (ST 1204). When there are not a plurality of URIs, the normal calling process starts at ST 1205. On the other hand, when there are a plurality of URIs, the group calling process starts at ST 1206. The normal calling process according to the second embodiment of the present invention is the same as described in FIG. 8; therefore, their description is omitted. The group calling process according to the second embodiment of the present invention is later described.

After the normal calling process or the group calling process is performed, terminal B1 determines whether the calling result is "OK to talk" (ST 1207). When the calling result is "OK to talk", the communication process starts at ST 1208. When the calling result is other than "OK to talk", the disconnection process starts at ST 1209. In the communication process, the calling process performed by terminal B1 is completed when the communication between the operator of terminal B1 and the operator of the destination is finished. In the disconnection process, the calling process performed by terminal B1 is terminated after proceeding to the disconnection process.

Figure 13:
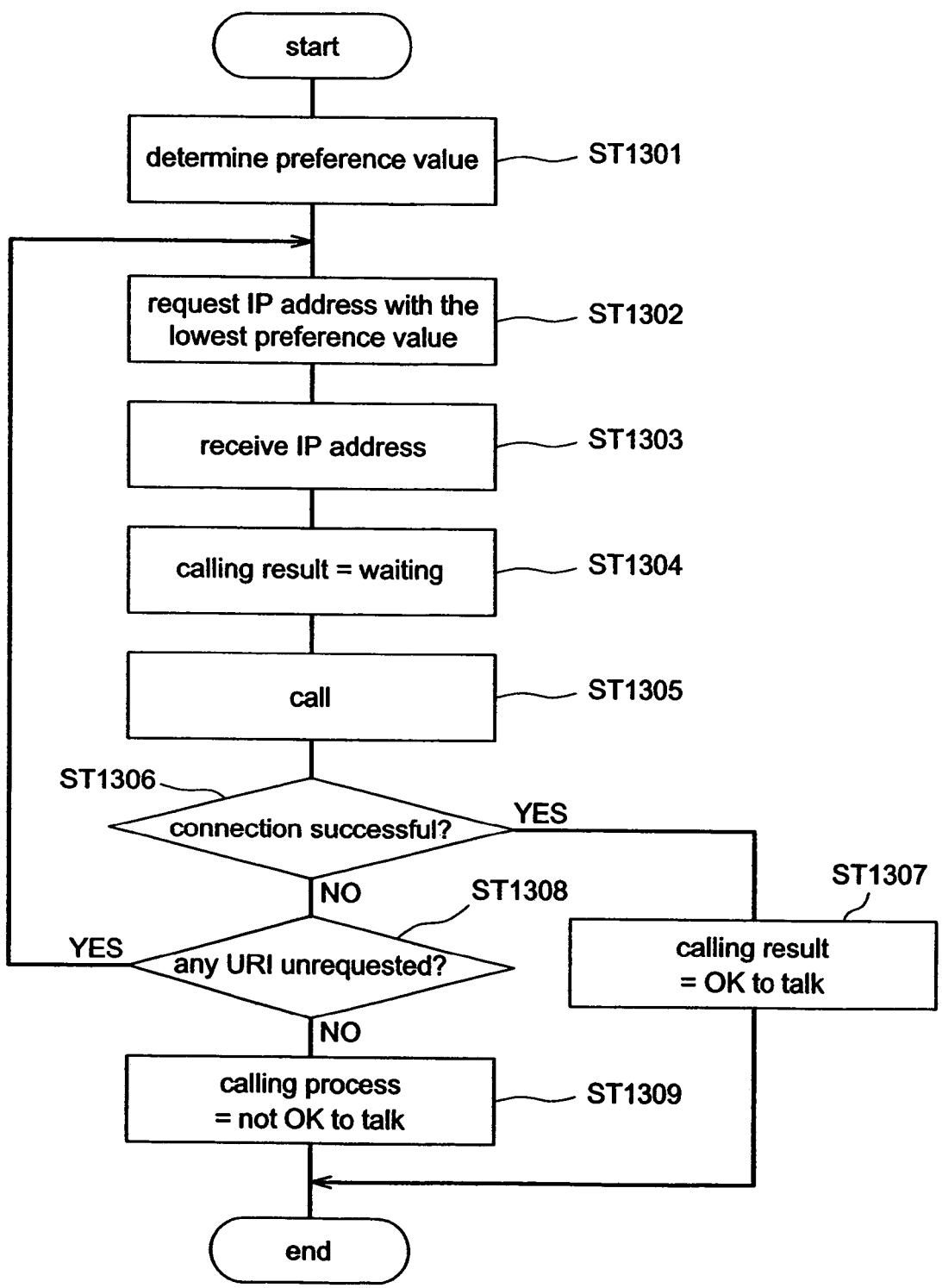
FIG. 13 illustrates a flow chart describing the group calling process according to the second embodiment of the present invention.

In the following, the group calling process according to the second embodiment of the present invention is described with reference to FIG. 13. FIG. 13 is a flow chart describing the group calling process according to the second embodiment of the present invention.

In the group calling process, terminal B1 determines the order of the received preference values (ST 1301). Terminal B1 then transmits, to server 101, a request for an IP address that corresponds to a URI having the lowest preference value (ST 1302).

Upon receiving the request for an IP address that corresponds to the URI from terminal B1, server 101 returns a corresponding IP address, and terminal B1 receives the IP address (ST 1303). Upon receiving the IP address, terminal B1 initializes the calling result (ST.1304) and places a call to the received IP address (ST 1305). Terminal B1 then determines whether terminal B1 has been successfully connected to the destination (ST 1306). When the connection has been successful, terminal B1 switches the calling result to "OK to talk" (ST 1307) and terminates the group calling process.

On the other hand, when terminal B1 has not been successfully connected to the destination, terminal B1 determines whether there is any URI with an IP address that has not been requested (ST 1308). When such a URI exists, terminal B1 returns the process to ST 1302. Terminal B1 then repeats ST 1302-ST 1308 on a URI having the lowest preference value among such URIs with IP addresses that have not requested. For example, when four URIs are received, ST 1302-ST 1308 are repeated up to four times.

After IP addresses corresponding to all URIs have been tried while repeating steps ST 1302-ST 1308, terminal B1 switches the calling result to "not OK to talk" (ST 1309) and terminates the group calling process.

As described above, in the Internet telephone system according to the second embodiment of the present invention, when a plurality of URIs are received, when these URIs have different preference values and when terminal B1 has not been successfully connected to a destination corresponding to one of these URIs, a different URI is selected, and another call is placed to a destination corresponding to the different URI. Accordingly, the operator only needs to input one telephone number. Even when no connection can be established with the destination, additional calls are automatically and sequentially placed to different destinations within the same group. Therefore, the operator does not have to go through the trouble of hanging up the phone and inputting different telephone numbers adjacent to the initial telephone number, when no connection can be established with one destination within the same group. This can save significant time and effort during the calling process.

The Internet telephone according to the second embodiment of the present invention places calls according to the order of the preference values. Accordingly, the order of calls is determined based on the preference values, enabling to specify the order of calls. Particularly, it is possible to place the first call to a destination having the lowest preference value. Therefore, the order of calls can be specified by setting the preference values to accommodate the desired order of calls.

In the above-described second embodiment of the present invention, the preference value stored in the NAPTR resource record is used as a parameter, and calls are placed to a plurality of destinations based on a priority. However, the method for placing calls to a plurality of destinations by using the preference value as a parameter is not limited to a case when calls are placed by setting a priority.

For example, it is also possible to set the same preference value and to place calls simultaneously to all destinations corresponding to URIs having the same preference value. When the NAPTR resource record shown in FIG. 5(a) is used for the Internet telephone according to the second embodiment of the present invention, the preference values stored in the NAPTR resource record shown in FIG. 5(a) are all set to "10". Therefore, at ST 1302 shown in FIG. 13, IP addresses that correspond to all URIs are requested, and calls are placed to all destination terminals (A1-A4) at ST 1305.

As described above, the Internet telephone according to the second embodiment of the present invention places calls simultaneously to destinations corresponding to all URIs, when the same preference value is set. Therefore, all adjacent telephones can be called simultaneously. This can save time and effort in case of emergency when placing calls without specifying an operator.

In the Internet telephone system according to the second embodiment of the present invention, the Internet telephone can be set to receive an instruction to disregard the preference value. Even when different preference values are set, and when the Internet telephone receives an instruction to disregard the preference values, it is possible to disregard the preference values and to place calls simultaneously to destinations corresponding to all URIs. In this case, calls can be placed simultaneously to all adjacent telephones even when different preference values are set. This can save time and effort in case of emergency when placing calls without specifying an operator.

Furthermore, it is also possible to create a plurality of groups having the same preference value and to place calls based on the priority set by groups. FIG. 14 illustrates an example of the NAPTR resource record stored in memory 403 of server 101. The NAPTR resource record described in FIG. 14 is the same as described in FIG. 11 except the preference value; therefore, a detailed description is omitted. The NAPTR resource record described in FIG. 14 is different from that of FIG. 11 in that FIG. 14 has groups with the same preference.

In FIG. 14, four URIs correspond to domain name "0.0.0.0.0.0.0.1.3.1.8.e164.arpa" obtained from the main telephone number of terminal A1 "0310000000". Of the NAPTR resource records including these URIs, the NAPTR resource records including "81310000000@tokyo.sip.jp" and "81310000001@tokyo.sip.jp" have a preference value of "10". Also, the NAPTR resource records including "81310000002@tokyo.sip.jp" and "81310000003@tokyo.sip.jp" have a preference value of "20". Therefore, for the first time around at ST 1302 shown in FIG. 13, the IP addresses corresponding to "81310000000@tokyo.sip.jp" and "81310000001@tokyo.sip.jp" are requested. At the same time, calls are placed simultaneously to terminal A1 and terminal A2 for the first time around at ST 1305. For the second time around at ST 1302, the IP addresses corresponding to "81310000002@tokyo.sip.jp" and "81310000003@tokyo.sip.jp" are requested. At the same time, calls are placed simultaneously to terminal A3 and terminal A4 for the second time around at ST 1305.

As described above, in the Internet telephone system according to the second embodiment of the present invention, it is possible to create a plurality of groups with the same preference values and to place calls based on a priority set by group by group. Therefore, the order of calls can be specified by creating groups which accommodate the desired order of calls.

Two different calling processes have been described above: a process where different preference values are set, and calls are placed to a plurality of destinations based on the priority set by the preference values; and a process where the same preference value is set, and calls are placed simultaneously to a plurality of destinations. However, configurations can also be made such that where the above two processes operate concurrently. For example, such a configuration is possible by adding a new telephone number to the above-noted telephone numbers (0310000000-0310000003). In this example, telephone number "0310000004" is added and is set to make a plurality of calls simultaneously (hereafter referred to as "simultaneous calling number").

FIG. 15 illustrates an example of the NAPTR resource record stored in memory 403 of server 101. The NAPTR resource record described in FIG. 15 is the same as described in FIG. 11 except FIG. 15 has additional NAPTR resource records in the bottom row; therefore a detailed description is omitted.

In FIG. 15, four URIs "81310000000@tokyo.sip.jp", "81310000001@tokyo.sip.jp", "81310000002@tokyo.sip.jp" and "81310000003@tokyo.sip.jp" correspond to domain name "4.0.0.0.0.0.0.1.3.1.8.e164.arpa" obtained from telephone number "0310000004". The NAPTR resource records including these URIs have the same preference value "10". Therefore, when telephone number "031000000" is input, calls are placed to a plurality of destinations based on a priority set specified by different preference values. On the other hand, when simultaneous calling telephone number "0310000004" is input, calls are placed simultaneously to a plurality of destinations based on the same preference value.

As described above, in the Internet telephone system according to the second embodiment of the present invention, when a plurality of URIs are received from server 101, when different preference values are set (when the above-noted telephone number 0310000000 is input) and when terminal B1 has not been successfully connected to a URI having the highest priority, another call is placed to a URI with the second highest priority. Accordingly, the operator needs only to input one telephone number. Even when no connection can be established with the destination, additional calls are automatically and sequentially placed to different destinations within the same group. Therefore, even when no connection is possible with one telephone within the same group, the operator does not have to go through the trouble of hanging up the phone and inputting different telephone numbers adjacent to the initial telephone number. This can save significant time and effort during the calling process.

On the other hand, when the same preference value is set (when the above-noted telephone number is input for the simultaneous calling), calls are placed simultaneously to destinations corresponding to all URIs. Accordingly, calls can be placed simultaneously to all adjacent telephones. This can save time and effort in case of emergency when placing calls without specifying an operator.

Third Embodiment

The Internet telephone system according to the second embodiment of the present invention places calls to a plurality of destinations based on a priority specified by the preference values stored in the NAPTR resource record, and uses only sip (Session Initiation Protocol) as a service protocol (communication type). The Internet telephone according to the third embodiment of the present invention differs in that it combines sip with other service protocols.

The Internet telephone according to the third embodiment of the present invention uses, for example, e-mail and FAX via telephone as service protocols to be combined with sip. In the following, particularly, a configuration where the calling process is combined with email and FAX via telephone is described. However, service protocols are not limited to these, and the Internet telephone can surely be configured to use H. 323, telephone using H. 323, FAX via the Internet, conventional telephone and the web as service protocols.

FIG. 16 illustrates an example of the NAPTR resource record stored in memory 403 of server 101 according to the third embodiment of the present invention. The NAPTR resource record described in FIG. 16 is the same as described in FIG. 11 except the bottom two NAPTR resource records of the group of six on top have been added in FIG. 16; therefore, a detailed description is omitted.

In FIG. 16, six URIs correspond to domain name "0.0.0.0.0.0.0.1.3.1.8.e164.arpa" obtained from telephone number "0310000000". The NAPTR resource records including the top four URIs are the same as those in FIG. 11; therefore, their description is omitted. Of the two NAPTR resource records including the bottom two URIs of the group of six on top, the upper NAPTR resource record is set to "E2U+message:mailto" in the service field and specifies email as a service protocol (communication type). Email address "info@panasonic.co.jp" is specified as a URI. On the other hand, the lower NAPTR resource record is set to "E2U+tel" and specifies FAX via telephone as a service protocol. Fax address "+81310000010;svc=fax" is specified as a URI. Furthermore, the upper NAPTR resource record has a preference value of "50", and the lower NAPTR resource record has a preference value of "60".

Figure 17:
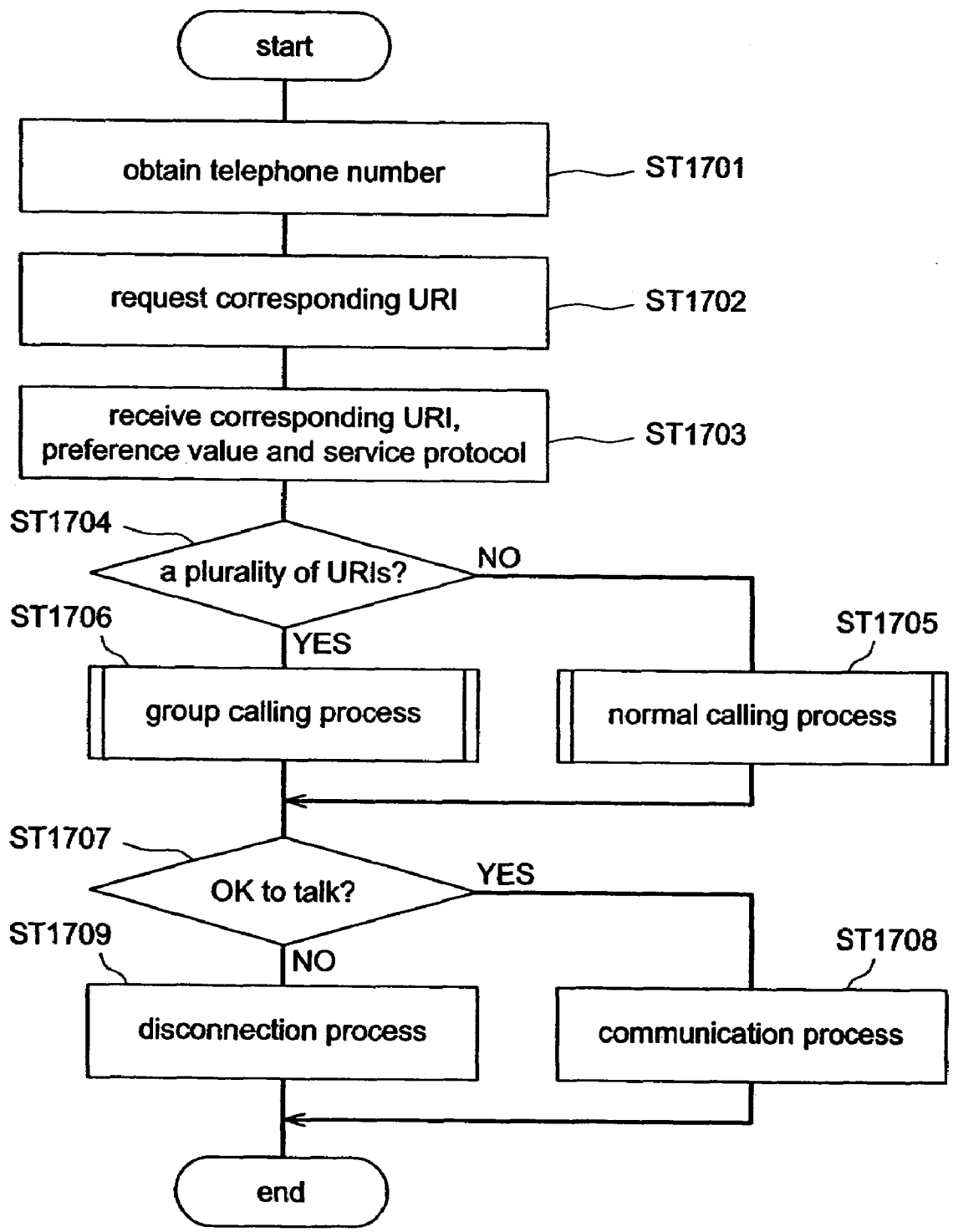
FIG. 17 illustrates a flow chart describing the calling process between the Internet telephones connected to the server according to the third embodiment of the present invention.

In the following, the calling process between the Internet telephones connected to server 101 configuring the above-described embodiment is described with reference to FIG. 17. Particularly, the calling process from terminal B1 to a terminal within group (A) is described. Information described in FIG. 16 and FIG. 6 is stored in memory 403 of server 101.

When placing a call to a terminal within group (A), terminal B1 obtains one of the input telephone numbers of terminals A1-A4 from the operator (ST 1701). For example, when placing a call to terminal A1, terminal B1 obtains "0310000000" or "10000000" with "03" omitted from the operator.

Upon obtaining the input telephone number, terminal B1 transmits, to server 101, a request for URI(s), preference value(s) and service protocol(s) that correspond to the telephone number (ST 1702). In the above-noted example, terminal B1 obtains a data string "0.0.0.0.0.0.0.1.3.1.8.e164.arpa" from "0310000000(10000000)" and requests URI(s), preference value(s) and service protocol(s) that correspond to the data string.

Upon receiving the request for URI(s), preference value(s) and service protocol(s) from terminal B1, server 101 returns corresponding URI(s), preference value(s) and service protocol(s), and terminal B1 receives the URI(s), the preference value(s) and the service protocol(s) (ST 1703). In the above-noted example, server 101 returns six URIs, six preference values and six service protocols according to the NAPTR resource record shown in FIG. 16. More specifically, "81310000000@tokyo.sip.jp", "10" and "E2U+sip"; "81310000001@tokyo.sip.jp", "20" and "E2U+sip"; "81310000002@tokyo.sip.jp", "30" and "E2U+sip"; "81310000003@tokyo.sip.jp", "40" and "E2U+sip"; "info@panasonic.co.jp", "50" and "E2U+message:mailto"; and "+81310000010;svc=fax", "60" and "E2U+tel" are returned.

Upon receiving URI (s) and other information, terminal B1 determines whether there are a plurality of URIs (ST 1704). When there are not a plurality of URIs, the normal calling process starts at ST 1705. On the other hand, when there are a plurality of URIs, the group calling process starts at ST 1706. The normal calling process according to the third embodiment of the present invention is the same as described in FIG. 8; therefore, its description is omitted. The group calling process according to the third embodiment of the present invention is later described.

After the normal calling process or the group calling process is performed, terminal B1 determines whether the calling result is "OK to talk" (ST 1707). When the calling result is "OK to talk", the communication process starts at ST 1708. On the other hand, when the calling result is other than "OK to talk", the disconnection process starts at ST 1709. In the communication process, the calling process performed by terminal B1 is completed when the communication between the operator of terminal B1 and the operator of the destination is finished. In the disconnection process, the calling process performed by terminal B1 is terminated after proceeding to the disconnection process.

Figure 18:
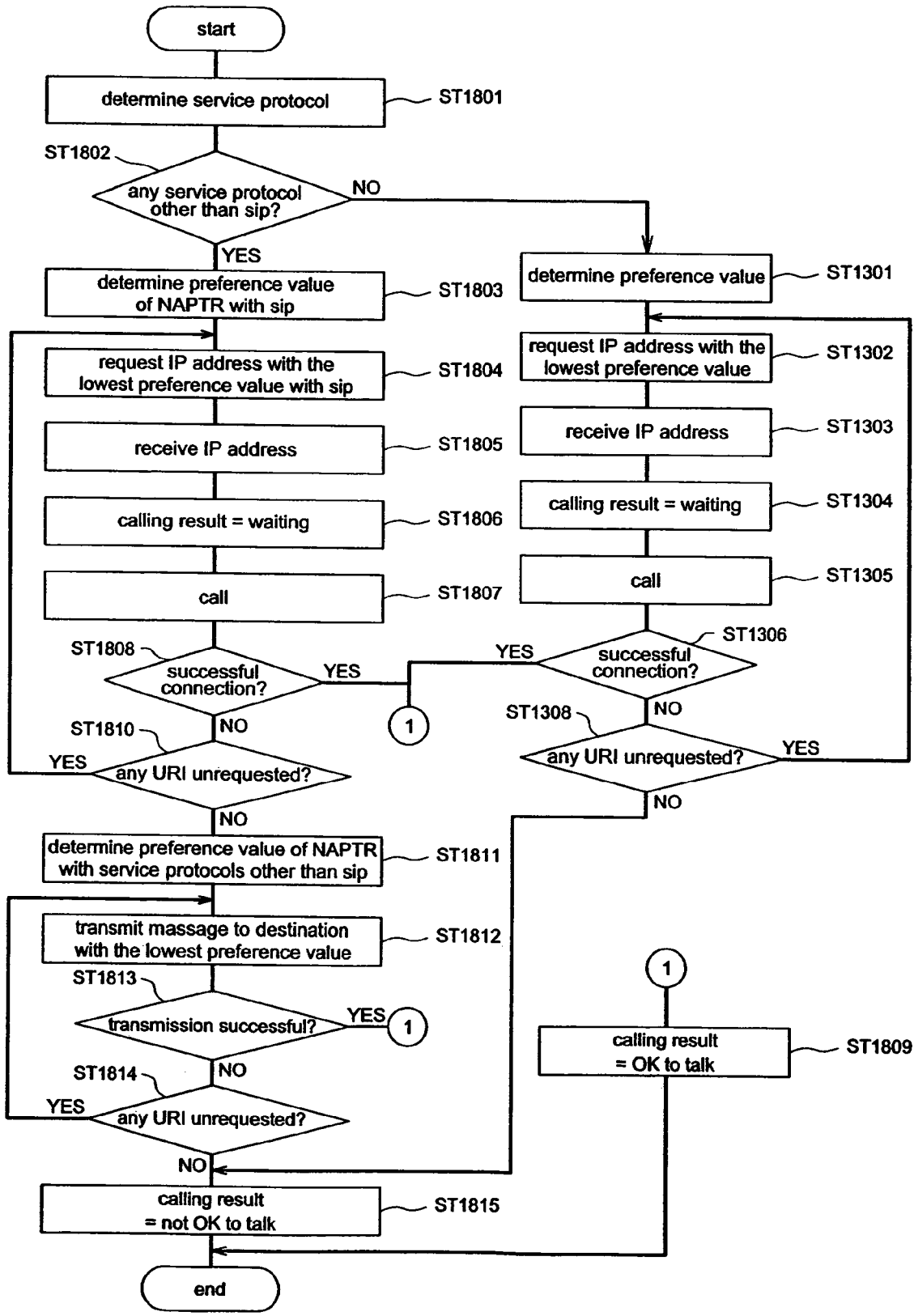
FIG. 18 illustrates a flow chart describing the group calling process according to the third embodiment of the present invention.

In the following, the group calling process according to the third embodiment of the present invention is described with reference to FIG. 18. FIG. 18 illustrates a flow chart describing the group calling process according to the third embodiment of the present invention. For the same processes as those described in FIG. 13, the same ST numbers are used for FIG. 18, and their detailed description is omitted.

In the group calling process, terminal B1 determines the types of the received service protocols (ST 1801). Terminal B1 then determines whether any service protocol other than sip is included (ST 1802). When no service protocol other than sip is included, ST 1301-ST 1306 and ST 1308 shown in FIG. 13 are performed. At the same time, terminal B1 switches the calling result to "OK to talk" or "not OK to talk" at ST 1809 and ST 1815, which are later described, and terminates the group calling process.

On the other hand, when any service protocol other than sip is included, terminal B1 first determines the order of the received preference values based on the NAPTR resource records with the sip service protocol (ST 1803). Terminal B1 then transmits, to server 101, a request for an IP address that corresponds to a URI having the lowest preference value (ST 1804).

Upon receiving the request for an IP address that corresponds to the URI from terminal B1, server 101 returns a corresponding IP address, and terminal B1 receives the IP address (ST 1805). Upon receiving the IP address, terminal B1 initializes the calling result (ST 1806) and places a call to the IP address (ST 1807). Terminal B1 then determines whether terminal B1 has been successfully connected to the destination (ST 1808). When the connection has been successful, terminal B1 switches the calling result to "OK to talk" (ST 1809) and terminates the group calling process.

On the other hand, when terminal B1 has not been successfully connected to the destination, terminal B1 determines whether there is any URI corresponding to sip with an IP address that has not been requested (ST 1810). When such a URI exists, terminal B1 returns the process to ST 1804. Terminal B1 then repeats ST 1804-ST 1810 on a URI having the lowest preference value among such URIs with IP addresses that have not been requested. For example, when four URIs with the sip protocol are received, ST 1804-ST 1810 are repeated up to four times.

After IP addresses that correspond to all URIs with the sip protocol have been requested while repeating ST 1804-ST 1810, terminal B1 then determines the order of the preference values based on the NAPTR resource records with service protocols other than sip (ST 1811). Terminal B1 then transmits a predetermined template message to a destination that corresponds to a URI having the lowest preference value (ST 1812).

In the example shown in FIG. 16, a template message is sent by email to email address "info@panasonic.co.jp". Such a template message can indicate, for instance, "I called Mr. XX, but you seemed to be out of the office. Please return my call." However, such template messages are not limited to this type and can contain any other information.

Terminal B1 then determines whether the email has been successfully sent (ST 1813). When the email transmission has been successful, terminal B1 switches the calling result to "OK to talk" (ST 1809) and terminates the group calling process. On the other hand, when the email transmission has not been successful, terminal B1 determines whether there is any URI with an IP address that has not been tried (ST 1814). When such a URI exits, terminal B1 returns the process to ST 1812. Terminal B1 then repeats ST 1812 on a URI having the lowest preference value among such URIs with IP addresses that have not been requested. In the example shown in FIG. 16, a template message is transmitted as a fax message to telephone number "+81310000010". The template message is the same as the one used for email.

After IP addresses corresponding to all URIs have been tried while repeating ST 1812-ST 1814, terminal B1 switches the calling result to "not OK to talk" (ST 1815) and terminates the group calling process.

As described above, in the Internet telephone system according to the third embodiment of the present invention, when a plurality of URIs are received from server 101, and when there are sip and any other service protocol (communication type) in the service field, calls are placed to destinations corresponding to URIs with the sip protocol. When terminal B1 has not been successfully connected to a destination that corresponds to one of these URIs, a different URI is selected, and another call is placed to a destination corresponding to the URI. Accordingly, the operator only needs to input one telephone number. Even when no connection can be established with the destination, additional calls are automatically and sequentially placed to different destinations within the same group. Therefore, even when no connection is possible to one telephone within the same group, the operator does not have to go through the trouble of hanging up the phone and inputting different telephone numbers adjacent to the initial telephone number. This can save significant time and effort during the calling process.

When terminal B1 has not been successfully connected to destinations corresponding to all URIs that have the sip protocol in the service field, calls are placed to URIs with service protocols other than sip, following processes appropriate for such protocols. Accordingly, even when terminal B1 has not been successfully connected to destinations corresponding to all URIs with sip, it is possible to deliver some message to destinations to which no successful connection has been made by registering processes that use service protocols other than sip.

Particularly, the Internet telephone according to the third embodiment of the present invention transmits a predetermined template message to a URI with email or FAX via telephone as a service protocol, when terminal B1 has not been successfully connected to destinations corresponding to all URIs with the sip protocol in the service field. Accordingly, for example, a message can be delivered to ask for returning a call to destinations to which no successful call has been made, by setting a template message to ask for returning a call.

Fourth Embodiment

The Internet telephone according to the second embodiment of the present invention places calls to a plurality of destinations based on the priority specified by the preference values stored in the NAPTR resource record. On the other hand, the Internet telephone according to the fourth embodiment of the present invention places calls to a plurality of destinations based on the priority specified by the operator.

The Internet telephone according to the fourth embodiment of the present invention stores, in memory 403 of server 101, identifications regarding the operators of the destination terminals, and returns URI(s) and identification(s) in response to a URI request from the originating Internet telephone. Upon confirming identification(s), the operator of the originating telephone specifies, by a dial key or the like, the priority for placing calls. The Internet telephone places calls according to the instructions from the operator.

Identifications regarding the operators of the destination terminals can be stored in any form in memory 403 of server 101 according to the fourth embodiment of the present invention. However, it is desirable to store identifications by corresponding them to URIs, since identifications are returned in response to a URI request from the originating Internet telephone.

FIG. 19 illustrates an example of identifications stored in memory 403 of server 101 according to the fourth embodiment of the present invention. FIG. 19(*a*) shows the URIs and the identifications corresponding to group (A). FIG. 19(*b*) shows the URIs and the identifications corresponding to group (B).

Figure 20:
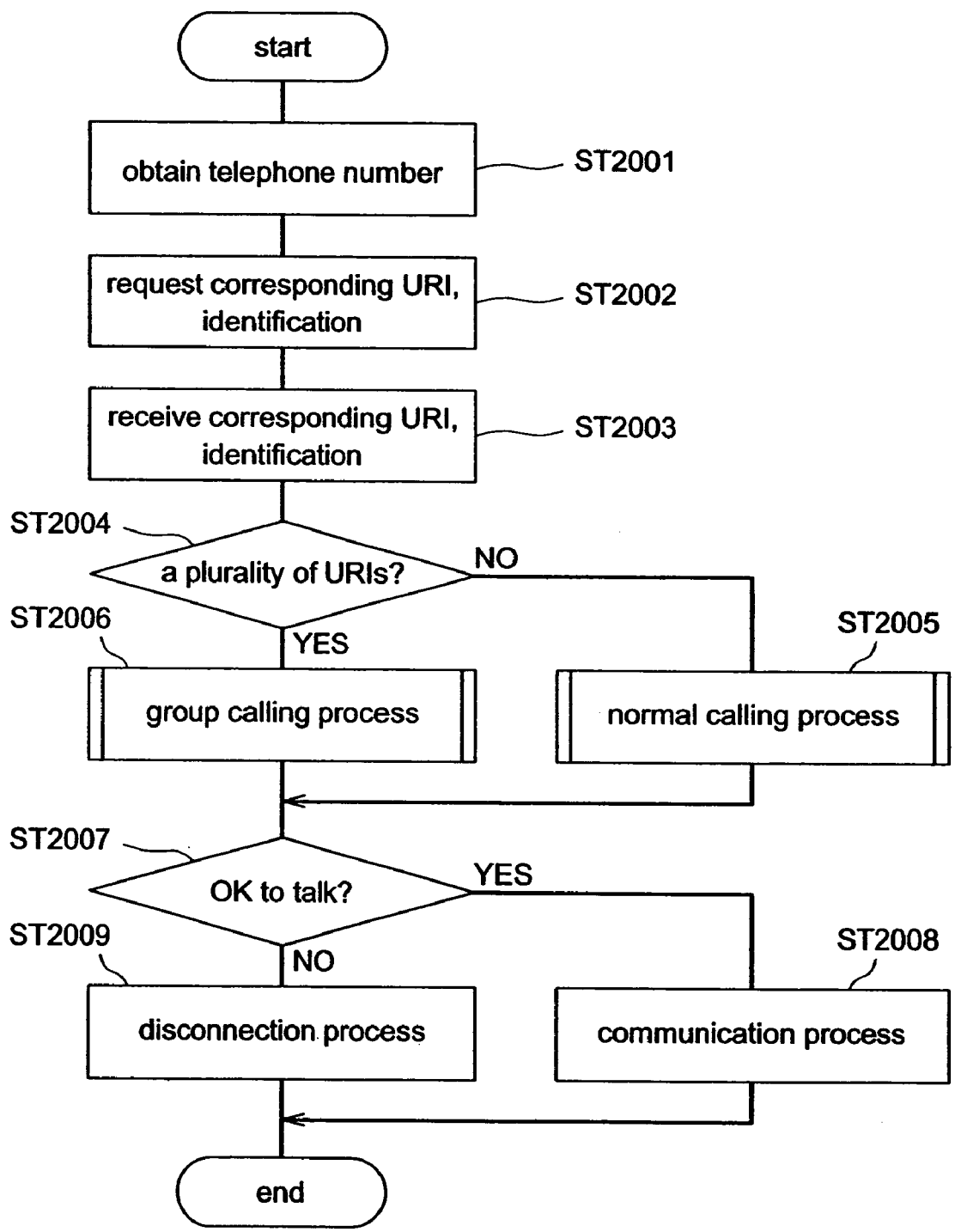
FIG. 20 illustrates a flow chart describing the calling process between the Internet telephones connected to the server according to the fourth embodiment of the present invention.

In the following, the calling process between the Internet telephones connected to sever 101 that comprises the above-described embodiment is described with reference to FIG. 20. Particularly, the calling process from terminal B1 to a terminal within group (A) is described. Information described in FIG. 5, FIG. 6 and FIG. 19 are stored in memory 403 of server 101.

When placing a call to a terminal within group (A), terminal B1 obtains one of the input telephone numbers of terminals A1-A4 from the operator (ST 2001). For example, when placing a call to terminal A1, "0310000000" or "10000000" with "03" omitted is obtained from the operator.

Upon obtaining the input telephone number, terminal B1 transmits, to server 101, a request for URI(s) and identification(s) that correspond to the telephone number (ST 2002). In the above-noted example, terminal B1 obtains a data string "0.0.0.0.0.0.0.1.3.1.8.e164.arpa" from "0310000000(10000000)". Terminal B1 then requests URI(s) and identification(s) that correspond to the data string.

Upon receiving the request for URI(s) and identification(s), server 101 returns corresponding URI(s) according to the NAPTR resource record stored in memory 403, and returns identification(s) that correspond to the URI(s), and terminal B1 receives the URI(s) and the identification(s) (ST 2003). In the above-noted example, server 101 returns four URIs that correspond to the above-noted data string according to the NAPTR resource record shown in FIG. 5, and returns four identifications that correspond to the URIs according to the contract chart shown in FIG. 19. More specifically, "81310000000@toyo.sip.jp" and "Matsushita Tarou"; "81310000001@tokyo.sip.jp" and "Matsushita Jirou"; "81310000002@tokyo.sip.jp" and "Matsushita Saburou"; and "81310000003@tokyo.sip.jp" and "Matsushita Hanako" are returned.

Upon receiving URI(s) and other information, terminal B1 determines whether there are a plurality of URIs (ST 2004). When there are not a plurality of URIs, the normal calling process starts at ST 2005. On the other hand, when there are a plurality of URIs, the group calling process starts at ST 2006. The normal calling process according to the forth embodiment is the same as described in FIG. 8; therefore, its description is omitted. The group calling process according to the fourth embodiment of the present invention is later described.

After the normal calling process or the group calling process is performed, terminal B1 determines whether the calling result is "OK to talk" (ST 2007). When the calling result is "OK to talk", the communication process starts at ST 2008. On the other hand, when the calling process is other than "OK to talk", the disconnection process starts at ST 2009. In the communication process, the calling process performed by terminal B1 is completed when the communication between the operator of terminal B1 and the operator of the destination is finished. In the disconnection process, the calling process performed by terminal B1 is terminated after proceeding to the disconnection process.

Figure 21:
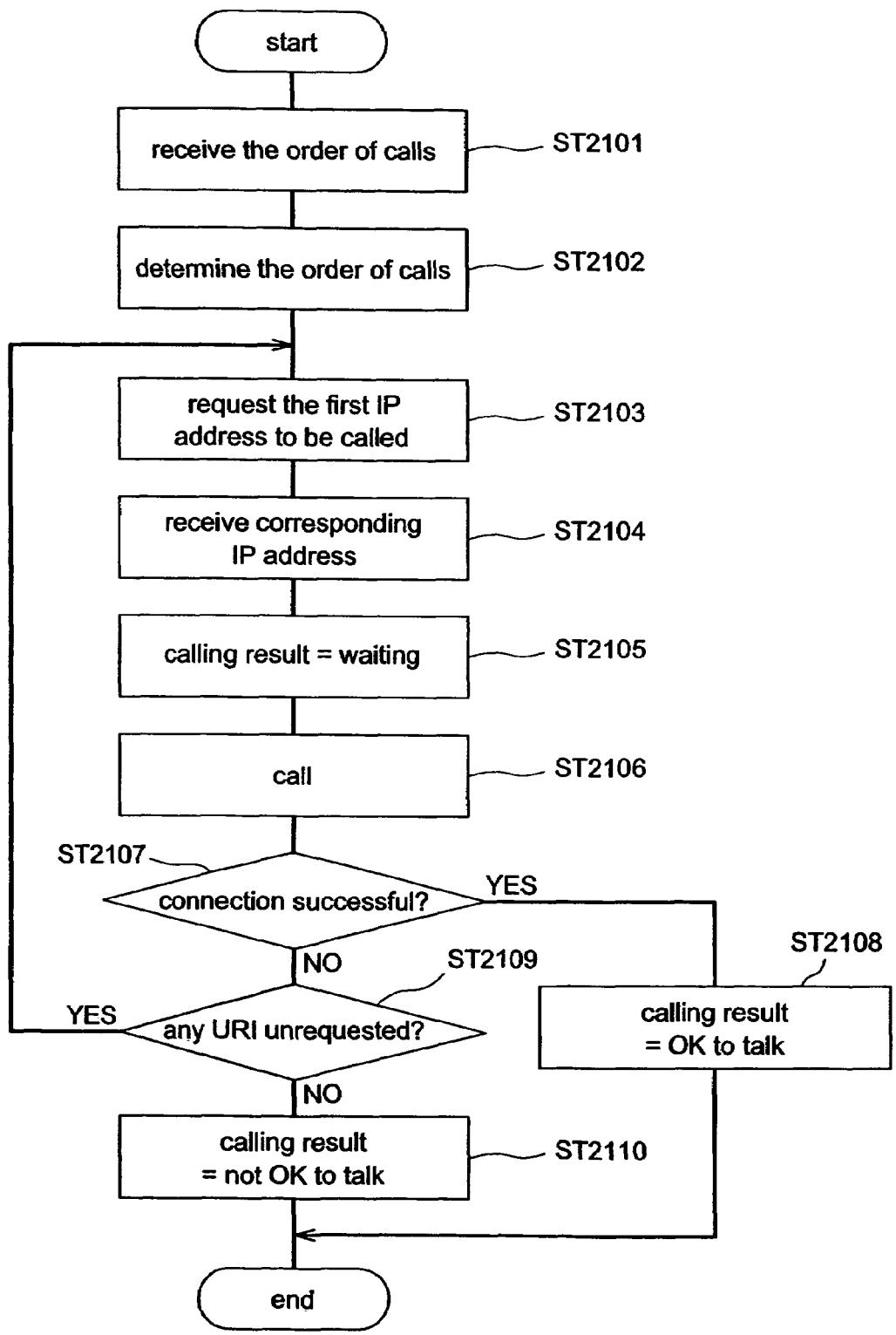
FIG. 21 illustrates a flow chart describing the group calling process according to the fourth embodiment of the present invention.

In the following, the group calling process according to the fourth embodiment of the present invention is described with reference to FIG. 21. FIG. 21 illustrates a flow chart describing the group calling process according to the fourth embodiment of the present invention.

In the group calling process, terminal B1 obtains the priority for placing calls, which means the order of calls, from the operator (ST 2101). When the group calling process starts, all identifications received at ST 2003 shown in FIG. 20 appear on the display of terminal B1. The operator of terminal B1 specifies the desired order to call the operators of the destination terminals based on the identifications, and terminal B1 obtains the instructions. For example, the operator of terminal B1 specifies the order of calls descending from the top row to the bottom row of the identifications shown in FIG. 19(a).

Upon obtaining the order of calls, terminal B1 determines the specified order of calls (ST 2102). Terminal B1 then identifies the order of destinations to call in the group calling process. In the above-noted example, it is determined that calls should be placed in the order of "Matsushita Tarou", "Matsushita Jirou", "Matsushita Saburou" and "Matsushita Hanako".

Next, terminal B1 transmits, to server 101, a request for an IP address that corresponds to a URI with an identification that should be called first (ST 2103). In the above-noted example, the IP address that corresponds to "8131000000@tokyo.sip.jp" with identification "Matsushita Tarou" is requested.

Upon receiving the request for an IP address that corresponds to the URI from terminal B1, server 101 returns a corresponding IP, and terminal B1 receives the IP address (ST 2104). Upon receiving the IP address, terminal B1 initializes the calling result (ST 2105) and places a call to the IP address (ST 2106). Terminal B1 then determines whether terminal B1 has been successfully connected to the destination (ST 2107). When the connection has been successful, terminal B1 switches the calling result to "OK to talk" (ST 2108) and terminates the group calling process.

On the other hand, when terminal B1 has not been successfully connected to the destination, terminal B1 determines whether there is any URI with an IP address that has not been requested (ST 2109). When such a URI exits, terminal B1 returns the process to ST 2103. Terminal B1 then repeats ST 2103-ST 2109 on a URI specified as the highest priority for placing calls among such URIs with IP addresses that have not been requested. For example, when four URIs are received, ST 2103-ST 2109 are repeated up to four times.

After IP addresses corresponding to all URIs have been requested while repeating ST 2103-ST 2109, terminal B1 switches the calling result to "not OK to talk" (ST 2110) and terminates the group calling process.

As described above, in the. Internet telephone system according to the fourth embodiment of the present invention, when a plurality of URIs are received from server 101, and when the order of calls is specified based on the identifications, calls are placed according to the specified order of calls. When terminal B1 has not been successfully connected to a destination that corresponds to one of these URIs, a different URI is selected, and a call is placed to a destination corresponding to the URI. Accordingly, the operator only needs to input one telephone number and specify the order of calls. Even when no connection can be established with the destination, additional calls are automatically and sequentially placed to different destinations within the same group. Therefore, even when no connection is possible with one telephone within the same group, the operator does not have to go through the trouble of hanging up the phone and inputting different telephone numbers adjacent to the initial telephone number. This can save significant time and effort during the calling process.

Particularly, in the Internet telephone system according to the fourth embodiment of the present invention, calls are placed based on the order of calls specified by the operator. Accordingly, the operator of the originating telephone can specify the operator of the destination to which a message is directed. As a result, it is possible to prevent situations where operators who are not concerned with the message may be interrupted by the call.

Fifth Embodiment

In the Internet telephone system according to the first, second, third or fourth embodiment of the present invention as described above, its application may be limited when the Internet telephone is set on a network such as an in-house LAN and cannot be directly accessed from an external network. For example, its application is limited when a private IP address is assigned to the Internet telephone on an in-house LAN, and when communication with an external network is made via a router having a function of a NAT (Network Address Translation) (hereafter referred to as NAT router). In the Internet telephone system according to the fifth embodiment of the present invention, even when no direct access is possible from an external network, the Internet telephone is able to automatically place calls to other telephones within the same group on the same network without involving an operator.

Figure 22:
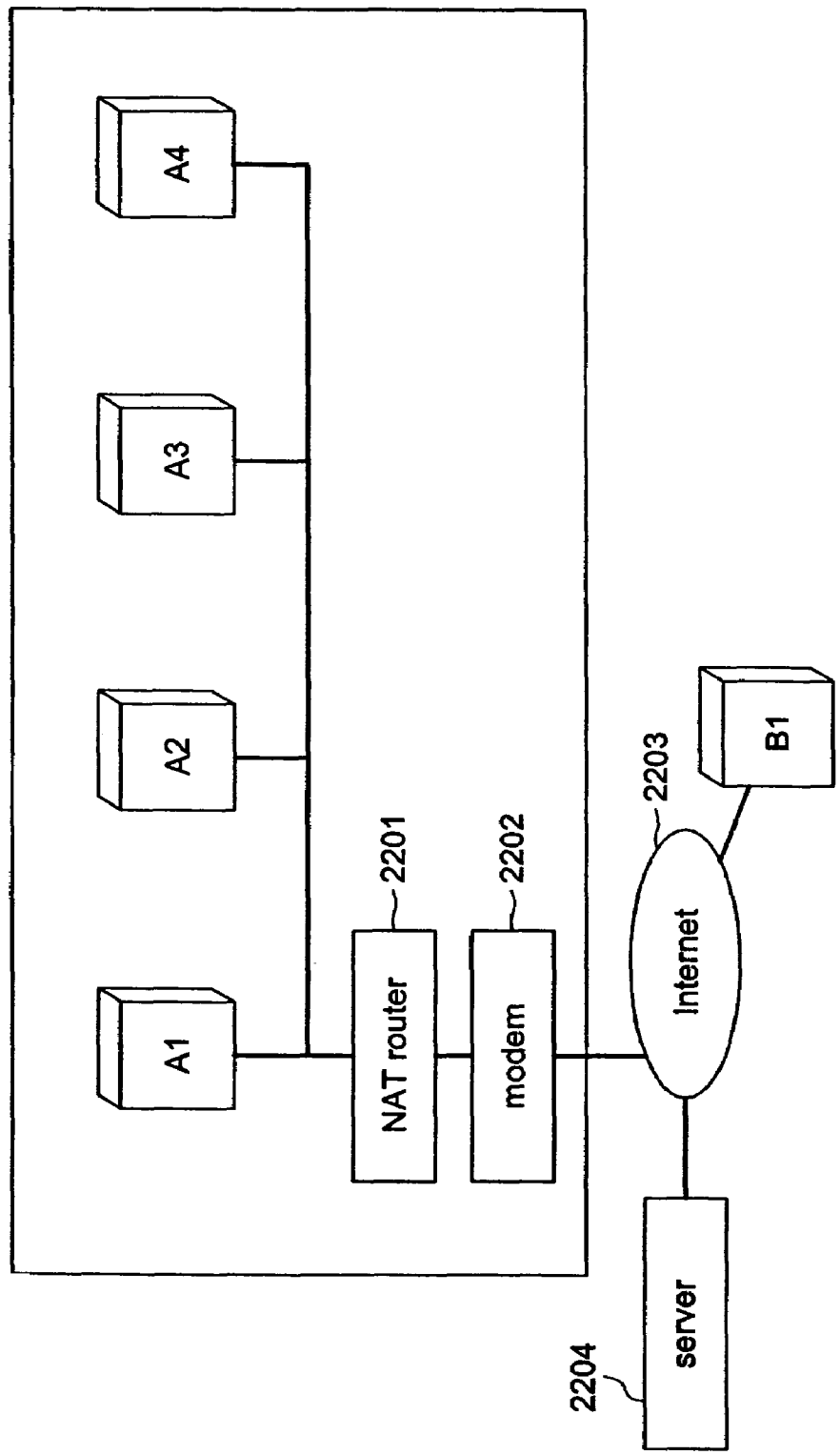
FIG. 22 illustrates a configuration of a network that connects the Internet telephones according to the fifth embodiment of the present invention.

FIG. 22 illustrates a configuration of a network that connects the Internet telephones according to the fifth embodiment of the present invention.

In FIG. 22, Internet telephones (terminals) A1-A4 are set on an in-house LAN, and terminal B1 is set on an external network. As the example shown in FIG. 2(a), telephone numbers 0310000000-0310000003 are respectively assigned to terminals A1-A4. Unlike the example shown in FIG. 2(a), private IP addresses (local IP addresses) 192.168.1.100-192.168.1.103 are assigned as IP addresses. Global IP address 2.2.2.2 is assigned to NAT router 2201. When accessing a terminal on an external network (e.g., terminal B1) from terminals A1-A4, private IP addresses are converted into global IP addresses at NAT router 2201. Then, communication is established via Internet 2203 under the control of modem 2202. Although FIG. 22 describes terminal B1 as an Internet telephone set on an external network, configurations are not limited to this. Terminal B1 can be a terminal connected via an in-house LAN such as terminals A1-A4.

Sever 2204 has the same configuration as described in FIG. 4 except network I/F 404 controls signals with the Internet. Memory 403 of server 2204 according to the fifth embodiment of the present invention stores a database (NAPTR resource record) necessary to convert the telephone numbers assigned to terminals A1-A4 into their corresponding URIs, and stores IP addresses that correspond to the URIs converted from the telephone numbers. However, according to the fifth embodiment of the present invention, private IP addresses are assigned to terminals A1-A4. Therefore, the global IP address of NAT router 2201 corresponds to all of the converted URIs.

FIG. 23 is a chart illustrating an example of the NAPTR resource record stored in memory 403 of server 2204 according to the fifth embodiment of the present invention. FIG. 23 shows the NAPTR resource records corresponding to terminals A1-A4.

As shown in FIG. 23, four URIs (81310000000@tokyo.sip.jp:5060), (81310000001@tokyo.sip.jp:60001), (81310000002@tokyo.sip.jp:60002) and (81310000003@tokyo.sip.jp:60003) correspond to domain name (0.0.0.0.0.0.0.1.3.1.8.e164.arpa) obtained from the main telephone number of terminal A1 (0310000000). Similarly, URIs (8131000000@tokyo.sip.jp:60001), (81310000000@tokyo.sip.jp:60002) and (81310000000@tokyo.sip.jp:60003) respectively correspond to domain names (1.0.0.0.0.0.0.1.3.1.8.e164.arpa), (2.0.0.0.0.0.0.1.3.1.8.e164.arpa) and (3.0.0.0.0.0.0.1.3.1.8.e164.arpa) obtained respectively from the telephone numbers of terminal A2 (0310000001), terminal A3 (0310000002) and terminal A4 (0310000003).

As described above, the above URIs have additional numbers, "5060", "60001", "60002" and "60003" respectively. These numbers represent port numbers used for communications. The added "5060" is a default port number for sip. "60001"-"60003" show examples of port numbers selected from undefined ports. These port numbers are used to perform port forwarding at NAT router 2201. In order to perform port forwarding, NAT router 2201 is configured to correspond specific port numbers to the IP addresses of terminals A1-A4.

FIG. 24 illustrates a chart describing specific port numbers and their corresponding private IP addresses stored in NAT router 2201 according to the fifth embodiment of the present invention.

As shown in FIG. 24, the private IP address of terminal A1 "192.168.1.100" corresponds to port number "5060". The private IP address of terminal A2 "192.168.1.101" corresponds to port number "60001". The private IP address of terminal A3 "192.168.1.102" corresponds to port number "60002". The private IP address of terminal A4 "192.168.1.103" corresponds to port number "60003". By setting IP addresses as described above, when a terminal on an external network accesses the IP address of NAT router 2201 (2.2.2.2), specifying a port number, communications become possible with a terminal having an IP address that corresponds to the specified port number.

Figure 25:
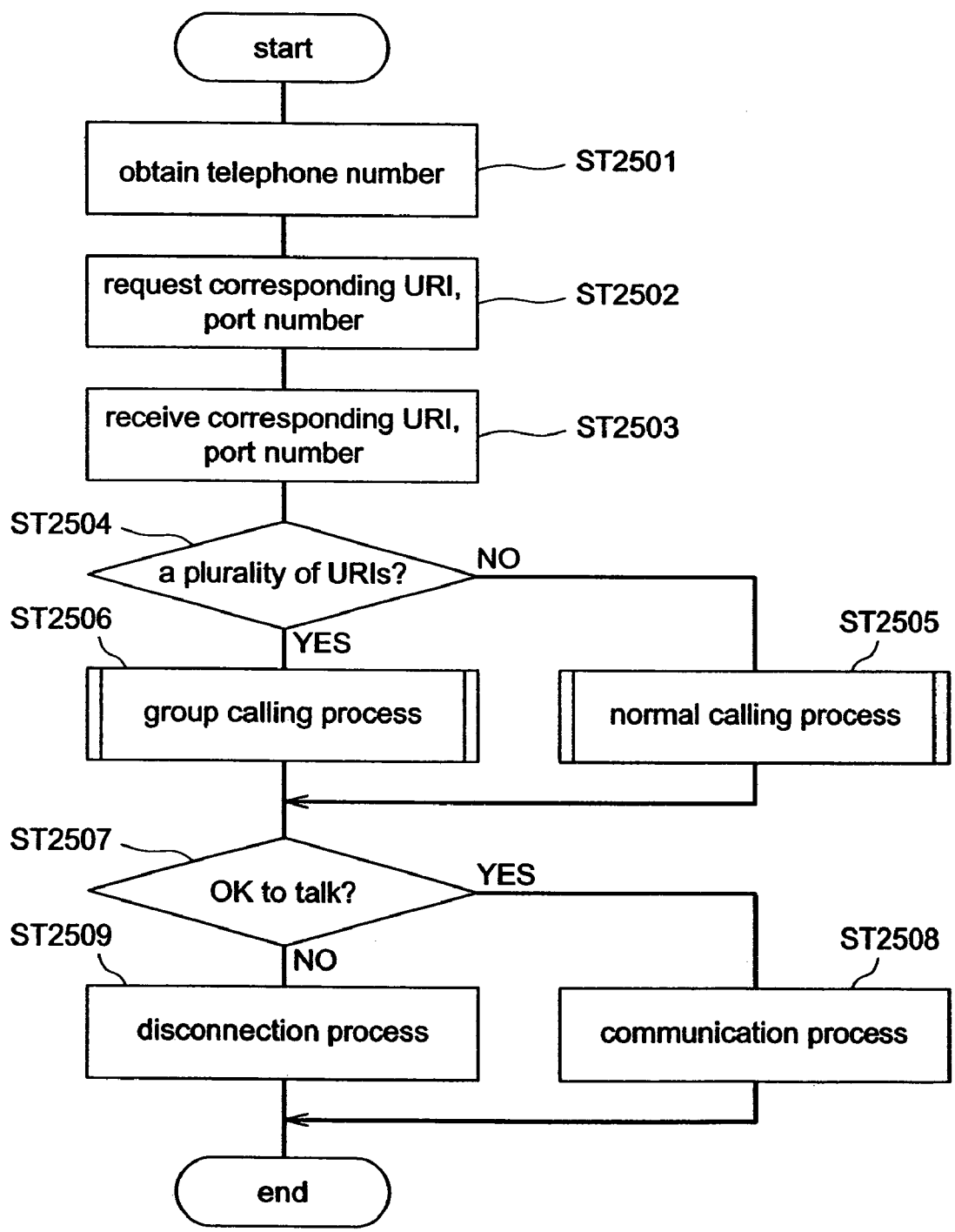
FIG. 25 illustrates a flow chart describing the calling process from an Internet telephone on an external network to the Internet telephones according to the fifth embodiment of the present invention.

In the following, the calling process from an Internet telephone on an external network to the Internet telephone according to the fifth embodiment of the present invention is described with reference to FIG. 25. In this example, the calling process from terminal B1 to one of terminals A1-A4 is described. The NAPTR resource record shown in FIG. 23 is stored in memory 403 of server 2204. NAT router 2201 stores information described in FIG. 24.

When placing a call to one of terminals A1-A4, terminal B1 obtains one of the input telephone numbers of terminals A1-A4 from the operator (ST 2501). For example, when placing a call to terminal A1, terminal B1 obtained the input telephone number of "0310000000" or "10000000" with "03" omitted from the operator.

Upon obtaining the input telephone number, terminal B1 transmits, to server 2204, a request for URI(s) that correspond(s) to the telephone number (ST 2502). In the fifth embodiment of the present invention, a port number is also requested in effect when the URI request is made, since a URI includes a port number. In the above-noted example, terminal B1 obtains a data string "0.0.0.0.0.0.0.1.3.1.8.e164.arpa" from telephone number "031000000(10000000)". Terminal B1 then requests URI(s) that correspond(s) to the data string.

Upon receiving the URI request, server 2204 returns corresponding URI(s) according to the NAPTR resource record stored in memory 403, and terminal B1 receives the URI(s) (ST 2503). In the fifth embodiment of the present invention, a port number is also received as a result, since a URI includes a port number. Accordingly, terminal B1 determines URI(s) and port number(s) that correspond to the input telephone number. In the above-noted example, server 2204 returns four URIs, which are correspond to the above-noted data string, "81310000000@tokyo.sip.jp:5060", "81310000001@tokyo.sip.jp:60001", "81310000002@tokyo.sip.jp:60002" and "81310000003@tokyo.sip.jp:60003".

Upon receiving URI(s) and other information, terminal B1 determines whether there are a plurality of URIs (ST 2504). When there are not a plurality of URIs, the normal calling process starts at ST 2505. On the other hand, when there are a plurality of URIs, the group calling process starts at ST 2506. The normal calling process and the group calling process according to the fifth embodiment of the present invention are later described.

After the normal calling process or the group calling process is performed, terminal B1 determines whether the calling result is "OK to talk" (ST 2507). When the calling result is "OK to talk", the communication process starts at ST 2508. On the other hand, when the calling result is other than "OK to talk", the disconnection process starts at ST 2509. In the communication process, the calling process performed by terminal B1 is completed when the communication between the operator of terminal B1 and the operator of the destination is finished. In the disconnection process, the calling process performed by terminal B1 is terminated after proceeding to the disconnection process.

Figure 26:
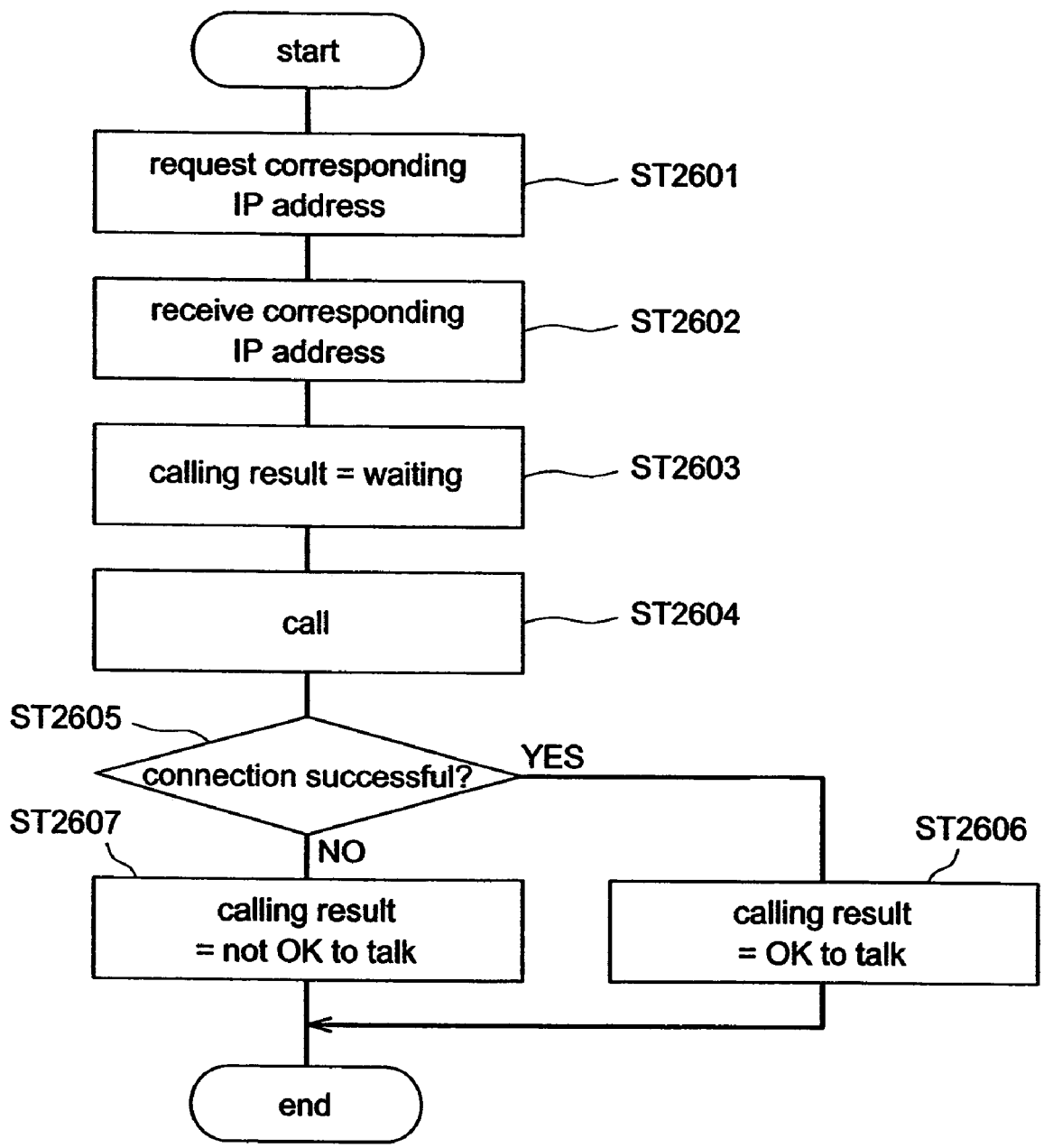
FIG. 26 illustrates a flow chart describing the normal calling process according to the fifth embodiment of the present invention.

In the following, the normal calling process according to the fifth embodiment of the present invention is described with reference to FIG. 26. FIG. 26 illustrates a flow chart describing the normal calling process according to the fifth embodiment of the present invention.

In the normal calling process, terminal B1 transmits, to server 2204, a request for an IP address that corresponds to the received URI (ST 2601). For example, when URI "81310000000@tokyo.sip.jp:5060" is received, terminal B1 transmits, to server 2204, a request for the IP address that corresponds to the URI.

Upon receiving the IP address request, server 2204 returns the corresponding IP address according to the information stored in memory 403, and terminal B1 receives the IP address (ST 2602). As described above, server 2204 according to the fifth embodiment of the present invention returns IP address (2.2.2.2), since server 2204 only stores the IP address of NAT router 2201. Upon receiving the IP address, terminal B1 corresponds the IP address to the port number received at ST 2503 shown in FIG. 25. As a result, terminal B1 determines the IP address of NAT router 2201 and the port number of the destination terminal.

Upon receiving the IP address, terminal B1 initializes the calling result (ST 2603). More specifically, terminal B1 initializes the calling result by setting it to "waiting".

Next, terminal B1 places a call to the received IP address (ST 2604). In the fifth embodiment of the present invention, terminal B1 accesses NAT router 2201 to place a call to the received port number of the destination. More specifically, the IP address of NAT router 2201 and the port number of the destination terminal are specified by describing "sip:2.2.2.2:5060" in the sip invite message.

After the calling process is performed, terminal B1 determines whether terminal B1 has been successfully connected to the specified destination (ST 2605). When the connection has been successful, terminal B1 switches the calling result to "OK to talk" (ST 2606) and terminates the normal calling process. On the other hand, when the connection has not been successful, terminal B1 switches the calling result to "not OK to talk" (ST 2607) and terminates the normal calling process. Accordingly, in the normal calling process, a call is placed to a single destination, and the calling result changes according to whether terminal B1 has been successfully connected to the destination.

Figure 27:
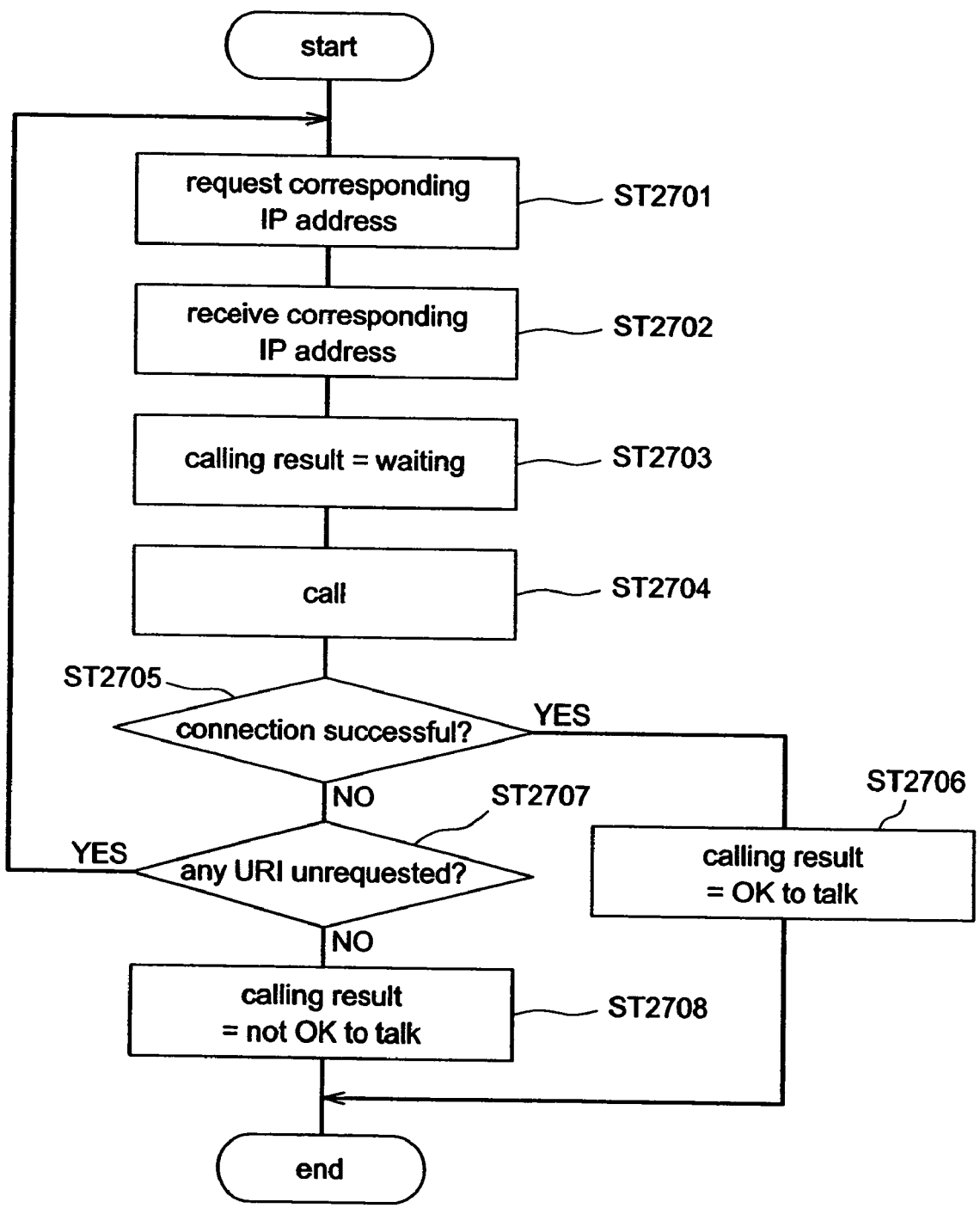
FIG. 27 illustrates a flow chart describing the group calling process according to the fifth embodiment of the present invention.
Figure 28:
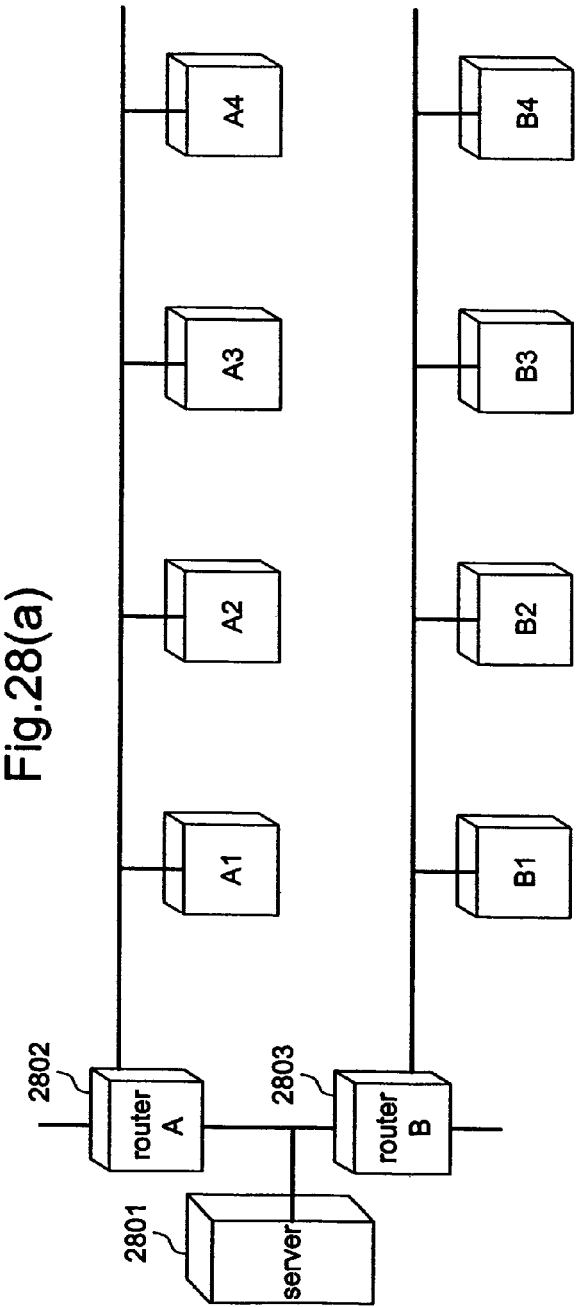
FIG. 28(a) illustrates a network configuration of a conventional Internet telephone system.
FIG. 28(b) illustrates management charts describing telephone numbers assigned to each Internet telephone and their corresponding IP addresses that are managed by the server of the conventional commonly used Internet telephone system.
FIG. 28(c) illustrates management charts describing telephone numbers assigned to each Internet telephone and their corresponding IP addresses that are managed by the server of the conventional commonly used Internet telephone system.
Figure 29:
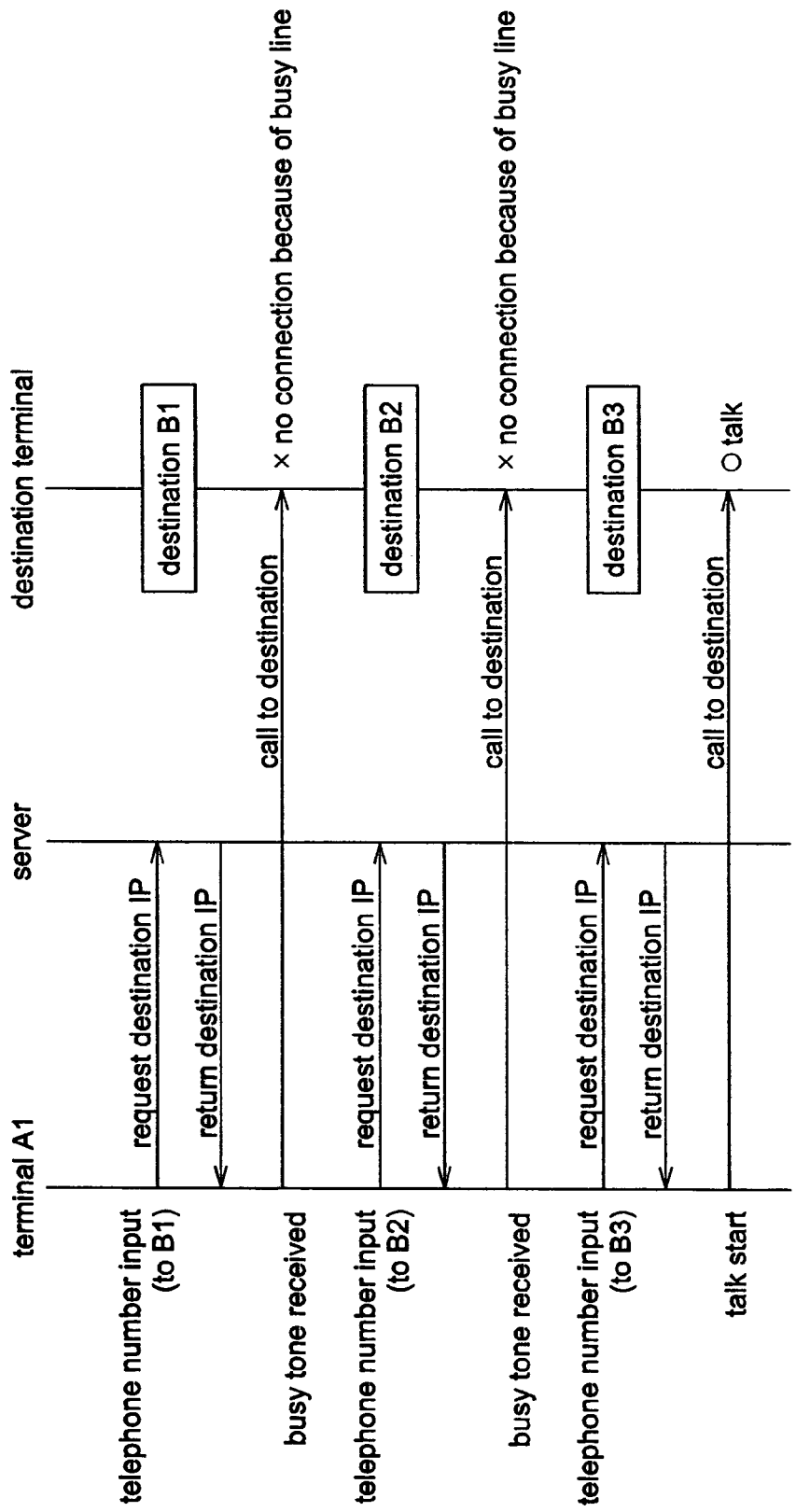
FIG. 29 illustrates a sequence diagram describing an operation of the conventional Internet telephone system.

In the following, the group calling process according to the fifth embodiment of the present invention is described with reference to FIG. 27. FIG. 27 illustrates a flow chart describing the group calling process according to the fifth embodiment of the present invention.

In the group calling process, terminal B1 transmits, to server 2204, requests for IP addresses that correspond to the received URIs (ST 2701). In the group calling process, a plurality of URIs are received. Therefore, terminal B1 transmits, to sever 2204, a request for an IP address that corresponds to one of these URIs. For example, when terminal B1 receives URIs "81310000000@tokyo.sip.jp:5060", "81310000001@tokyo.sip.jp:60001", "81310000002@tokyo.sip.jp:6000238 and "81310000003@tokyo.sip.jp:60003", terminal B1 transmits, to server 2204, a request for an IP address that corresponds to one of these URIs.

Upon receiving the IP address request, server 2204 returns the IP address of NAT router 2201 in the same way as described in the normal calling process, and terminal B1 receives the IP address (ST 2702). Upon receiving the IP address, in the same way as described in the normal calling process (ST 2503), terminal B1 determines the IP address of NAT router 2201 and the port number of the destination terminal by corresponding the IP address to the port number received at ST 2503 shown in FIG. 25.

Upon receiving the IP address, terminal B1 initializes the calling result (ST 2703) and places a call to the IP address (ST 2704). Terminal B1 then determines whether terminal B1 has been successfully connected to the destination (ST 2705). When the connection has been successful, terminal B1 switches the calling result to "OK to talk" (ST 2706) and terminates the group calling process.

On the other hand, when the connection has not been successful, terminal B1 determines whether there is any URI with an IP address that has not been requested (ST 2707). When such a URI exists, terminal B1 returns the process to ST 2701 and repeats ST 2701-ST 2707 until IP addresses corresponding to all URIs have been requested. When four URIs are received, ST 2701-ST 2707 are repeated up to four times.

After IP addresses corresponding to all URIs have been requested while repeating ST 2701-ST 2707, terminal B1 switches the calling result to "not OK to talk" (ST 2708) and terminates the group calling process. As described above, calls are placed to a plurality of destinations in the group calling process. When terminal B1 has not been successfully connected to any of the destinations, terminal B1 sets the calling result to "not OK to talk".

As described above, in the Internet telephone system according to the fifth embodiment of the present invention, there is a case where a plurality of URIs are received from server 2204, and where the specified URI includes a port number. In that case, when no connection is possible with a destination specified by a port number included in the specified URI and by an IP address that corresponds to one of these URIs, a different URI is selected, and another call is placed to a destination specified by a port number included in the specified URI and by an IP address that corresponds to the different URI. Accordingly, the operator only needs to input one telephone number. Even when there is no successful connection to that destination, additional calls are automatically and sequentially placed to different destinations within the same group. Therefore, the operator does not have to go through the trouble of hanging up the phone and inputting different telephone numbers adjacent to the initial telephone number. This can save significant time and effort during the calling process.

Particularly, in the Internet telephone system according to the fifth embodiment of the present invention, a call is placed to a destination specified by a port number included in a URI and by an IP address that corresponds to the URI. Therefore, for example, even when the Internet telephone has an assigned private IP address and cannot be directly accessed from an external network, it is possible to automatically place calls to telephones within the same group on the same network without involving an operator.

The above-described Internet telephone includes IP telephones defined by the Japanese government and managed by telecommunication provider and includes those operating via local networks or private networks using computer network protocols such as TCP/IP.

When using the Internet telephone, the network server, the communication method, and the Internet telephone system according to the present invention, it is possible to automatically place calls, without involving an operator, to telephones within the same group on the same network, even when the destination telephone is busy. The present invention is useful in that it can provide Internet telephones and other systems designed to improve convenience for an operator.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-083209 filed on Mar. 22, 2004, entire content of which is expressly incorporated by reference herein.

What is claimed is:

1. An Internet telephone apparatus connected to a server apparatus, the server apparatus storing a NAPTR (Naming Authority Pointer) resource record in which an ENUM domain name corresponds to a plurality of URIs, the server apparatus storing a plurality of IP addresses corresponding to the plurality of the URIs, the Internet telephone apparatus comprising:
a key pad configured to input a telephone number of a call destination, a plurality of telephone apparatuses being associated with the call destination;
a controller configured to generate an ENUM domain name based on the input telephone number, to transmit the generated ENUM domain name to the server apparatus, to receive the plurality of the URIs corresponding to the ENUM domain name from the server apparatus, to transmit one URI of the plurality of the received URIs to the server apparatus, to receive one IP address corresponding to the transmitted one URI from the server apparatus, and to access one of the plurality of the telephone apparatuses associated with the call destination for a call via the Internet, based on the one IP address,
the controller, when the accessed one of the plurality of the telephone apparatuses is unavailable, being further configured to transmit another URI of the plurality of the URIs to the server apparatus, to receive another IP address corresponding to the another URI from the server apparatus, to automatically access another telephone apparatus of the plurality of the telephone apparatuses associated with the call destination for a call via the Internet, based on the another IP address.

2. The Internet telephone apparatus according to claim 1, wherein the controller generates the ENUM domain name based on the input telephone number, by adding a country code to the input telephone number, by reversing an order of the added telephone number, and by adding a predetermined data string to the reversed telephone number.

3. The Internet telephone apparatus according to claim 1, wherein the server apparatus stores a NAPTR (Naming Authority Pointer) resource record in which an ENUM domain name corresponds to a plurality of URIs and to a plurality of reference values, each of the plurality of the reference values indicating an order of priority for each of the plurality of the URIs corresponding to an ENUM domain name, the server apparatus storing the plurality of the IP addresses corresponding to the plurality of the URIs,
the controller, when transmitting the generated ENUM domain name to the server apparatus, receives, from the server apparatus, the plurality of the URIs and the plurality of the reference values corresponding to the ENUM domain name, selects one URI from the plurality of the URIs based on the reference values, transmits the selected one URI to the server apparatus, receives one IP address corresponding to the selected one URI from the server apparatus, and accesses one of the plurality of the telephone apparatuses associated with the call destination for a call via the Internet, based on the one IP address, and
the controller further, when the accessed one of the plurality of the telephone apparatuses is unavailable, selects another URI from the plurality of URIs based on the reference values, transmits the selected another URI to the server apparatus, receives another IP address corresponding to the selected another URI from the server apparatus, and accesses another telephone apparatus of the plurality of the telephone apparatuses associated with the call destination for a call via the Internet, based on the another IP address.

4. The Internet telephone apparatus according to claim 3, wherein the reference values are stored in a reference field of the NAPTR (Naming Authority Pointer) resource record.

5. The Internet telephone apparatus according to claim 3, wherein, when the controller selects a first URI, the controller selects a URI having the smallest reference value of the plurality of reference values.

6. The Internet telephone apparatus according to claim 3, wherein, when more than two of the plurality of reference values have a same value, the controller selects the plurality of the URIS corresponding to the same value, transmits the plurality of the selected URIs to the server apparatus, receives a plurality of IP addresses corresponding to the plurality of the selected URIs from the server apparatus, and simultaneously accesses the plurality of the corresponding telephone apparatuses associated with the call destination for a call via the Internet, based on the plurality of the IP addresses.

7. The Internet telephone apparatus according to claim 3, wherein, when an indication is input from the key pad, the indication indicating ignoring of the reference values, the controller selects all of the plurality of the URIs, transmits all of the plurality of the URIs to the server apparatus, receives a plurality of IP addresses corresponding to all of the plurality of the URIs from the server apparatus, and simultaneously accesses all of the plurality of the telephone apparatuses associated with the call destination for a call via the Internet, based on the plurality of the IP addresses.

8. The Internet telephone apparatus according to claim 1, wherein the server apparatus stores a NAPTR (Naming Authority Pointer) resource record in which an ENUM domain name corresponds to a plurality of URIs and to a plurality of communication types, the server apparatus storing the plurality of the IP addresses corresponding to the plurality of the URIs,
the controller, when transmitting the generated ENUM domain name to the server apparatus, receives, from the server apparatus, the plurality of the URIs and the plurality of the communication types corresponding to the ENUM domain name, selects predetermined URIs from the plurality of the URIs based on the communication type, the communication type corresponding to a Session Initiation Protocol, transmits one URI of the predetermined URIs to the server apparatus, receives one IP address corresponding to the transmitted one URI from the server apparatus, and accesses one of the plurality of the telephone apparatuses associated with the call destination for a call via the Internet, based on the one IP address, and
the controller further, when the accessed one of the telephone apparatus is unavailable, transmits another URI of the predetermined URIs to the server apparatus, receives another IP address corresponding to the another URI from the server apparatus, and accesses another telephone apparatus of the plurality of the telephone apparatuses associated with the call destination for a call via the Internet, based on the another IP address.

9. The Internet telephone apparatus according to claim 8, wherein, when all of IP addresses corresponding to the predetermined URIs are unavailable, the controller select another predetermined URI, based on a communication type other than the Session Initiation Protocol.

10. The Internet telephone apparatus according to claim 9, wherein the communication type other than the Session Initiation Protocol comprises an e-mail communication, the another predetermined URI includes an e-mail address, and the controller accesses the server apparatus based on the another predetermined URI, whereby the server apparatus transmits a predetermined e-mail to the e-mail address included in the another predetermined URI.

11. The Internet telephone apparatus according to claim 10, wherein the predetermined e-mail indicates that the call destination is unavailable.

12. The Internet telephone apparatus according to claim 9, wherein the communication type other than the Session Initiation Protocol comprises a facsimile communication, the another predetermined URI includes a facsimile number, and the controller accesses the server apparatus based on the another predetermined URI, whereby the server apparatus transmits a predetermined facsimile data to the facsimile e-mail address included in the another predetermined URI.

13. The Internet telephone apparatus according to claim 12, wherein the predetermined facsimile data indicates that the call destination is unavailable.

14. The Internet telephone apparatus according to claim 8, wherein the communication types are stored in a service field of the NAPTR (Naming Authority Pointer) resource record.

15. The Internet telephone apparatus according to claim 1 further comprising a display configured to display data, wherein the server apparatus stores a NAPTR (Naming Authority Pointer) resource record in which an ENUM domain name corresponds to a plurality of URIs and to a plurality of identifications, the server apparatus storing the plurality of the IP addresses corresponding to the plurality of the URIs, the controller, when transmitting the generated ENUM domain name to the server apparatus, receives the plurality of the URIs and the plurality of the identifications corresponding to the ENUM domain name from the server apparatus, displays the plurality of the identifications, receives identification input by an operator of the Internet telephone apparatus, transmits, to the server apparatus, one URI corresponding to the input identification, receives one IP address corresponding to the transmitted one URI from the server apparatus, and accesses one of the plurality of the telephone apparatuses associated with the call destination for a call via the Internet, based on the one IP address, and the controller further, when the accessed one of the plurality of the telephone apparatuses is unavailable, receives another identification input by the operator of the Internet telephone apparatus, transmits, to the server apparatus, another URI corresponding to the selected another identification, receives another IP address corresponding to the another URI from the server apparatus, and accesses another telephone apparatus of the plurality of the telephone apparatuses associated with the call destination for a call via the Internet, based on the another IP address.

16. The Internet telephone apparatus according to claim 15, wherein the identification indicates an operator of each of the plurality of telephone apparatuses associated with the call destination.

17. The Internet telephone apparatus according to claim 1, wherein the server apparatus storing a NAPTR (Naming Authority Pointer) resource record in which an ENUM domain name corresponds to a plurality of URIs, the plurality of the URIs including a plurality of port numbers of a router, the router being connected to a plurality of telephone apparatuses associated with a call destination, the server apparatus storing an predetermined IP address corresponding to the plurality of the URIs, the controller, when transmitting the generated ENUM domain name to the server apparatus, receives the plurality of the URIs corresponding to the ENUM domain name from the server apparatus, each of the plurality of the URIs including one of the plurality of the port numbers, each of the plurality of the port numbers being associated with one of the plurality of the telephone apparatuses, transmits one URI of the plurality of the URIs to the server apparatus, receives the predetermined IP address corresponding to the plurality of URIs from the server apparatus, and accesses one of the plurality of the telephone apparatuses associated with the call destination for a call via the Internet, based on the predetermined IP address and one port number included in the one URI, and the controller further, when the one of the plurality of the telephone apparatuses is unavailable, accesses another telephone apparatus of the plurality of the telephone apparatuses associated with the call destination for a call via the Internet, based on the predetermined IP address and another port number included in another URI.

18. The Internet telephone apparatus according to claim 17, wherein the one of the plurality of the telephone apparatuses being unavailable comprises one of the telephone apparatus being is busy and the telephone apparatus not returning a response to the Internet telephone apparatus for a predetermined time.

19. A method for calling via an Internet network including a server apparatus, the server apparatus storing a NAPTR (Naming Authority Pointer) resource record in which an ENUM domain name corresponds to a plurality of URIs, the server apparatus storing a plurality of IP addresses corresponding to the plurality of the URIs, the method comprising:

inputting a telephone number of a call destination, a plurality of telephone apparatuses being associated with the call destination;

generating an ENUM domain name based on the input telephone number;

transmitting the generated ENUM domain name to the server apparatus;

receiving the plurality of the URIs corresponding to the ENUM domain name from the server apparatus;

transmitting one URI of the plurality of the received URIs to the server apparatus;

receiving one IP address corresponding to the transmitted one URI from the server apparatus;

accessing one of the plurality of the telephone apparatuses associated with the call destination for a call via the Internet, based on the one IP address, transmitting another URI of the plurality of the URIs to the server apparatus when the accessed one of the plurality of the telephone apparatuses is unavailable;

receiving another IP address corresponding to the another URI from the server apparatus; and automatically accessing another telephone apparatus of the plurality of the telephone apparatuses associated with the call destination for a call via the Internet, based on the another IP address.

20. The method according to claim 19, wherein the server apparatus stores a NAPTR (Naming Authority Pointer) resource record in which an ENUM domain name corresponds to a plurality of URIs and to a plurality of reference values, each of the plurality of the reference values indicating an order of priority for each of the plurality of the URIs corresponding to an ENUM domain name, the server apparatus storing the plurality of the IP addresses corresponding to the plurality of the URIs, the method further comprising:

receiving comprises receiving, from the server apparatus, the plurality of the URIs and the plurality of the reference values corresponding to the ENUM domain name;

selecting one URI of the plurality of the URIs based on the reference values;

transmitting the selected one URI to the server apparatus;

receiving one IP address corresponding to the selected one URI from the server apparatus;

accessing one of the plurality of the telephone apparatuses associated with the call destination for a call via the Internet based on the one IP address;

selecting another URI of the plurality of URIs based on the reference values when the accessed one of the plurality of the telephone apparatuses is unavailable;

transmitting the selected another URI to the server apparatus;

receiving another IP address corresponding to the selected another URI from the server apparatus; and accessing another telephone apparatus of the plurality of the telephone apparatuses associated with the call destination for a call via the Internet based on the another IP address.

21. The method according to claim 20, wherein more than two of the plurality of reference values have a same value, the method further comprising:

selecting the plurality of the URIS corresponding to the same value;

transmitting the selected plurality of the URIs to the server apparatus;

receiving a plurality of IP addresses corresponding to the selected plurality of the URIs from the server apparatus; and simultaneously accessing corresponding telephone apparatuses of the plurality of the telephone apparatuses associated with the call destination for a call via the Internet, based on the plurality of the IP addresses.

22. The calling method according to claim 19, wherein the server apparatus stores a NAPTR (Naming Authority Pointer) resource record in which an ENUM domain name corresponds to a plurality of URIs and to a plurality of communication types, the server apparatus storing the plurality of the IP addresses corresponding to the plurality of the URIs, the method further comprising:

receiving the plurality of the URIs and the plurality of the communication types corresponding to the ENUM domain name from the server apparatus;

selecting predetermined URIs from the plurality of the URIs based on the communication type, the communication type of the predetermined URIs corresponding to a Session Initiation Protocol;

transmitting one URI of the predetermined URIs to the server apparatus;

receiving one IP address corresponding to the transmitted one URI from the server apparatus;

accessing one of the plurality of the telephone apparatuses associated with the call destination for a call via the Internet, based on the one IP address;

transmitting another URI of the predetermined URIs to the server apparatus when the accessed one of the telephone apparatus is unavailable;

receiving another IP address corresponding to the another URI from the server apparatus; and accessing another telephone apparatus of the plurality of the telephone apparatuses associated with the call destination for a call via the Internet, based on the another IP address.

23. The calling method according to claim 19, wherein the server apparatus stores a NAPTR (Naming Authority Pointer) resource record in which an ENUM domain name corresponds to a plurality of URIs and to a plurality of identifications, the identifications corresponding to operators of a plurality of telephone apparatuses associated with a call destination, the server apparatus storing the plurality of the IP addresses corresponding to the plurality of the URIs, the method further comprising:

receiving the plurality of the URIs and the plurality of the identifications corresponding to the ENUM domain name, from the server apparatus;

displaying the plurality of the identifications;

receiving identification input by an operator of the Internet telephone apparatus;

transmitting, to the server apparatus, one URI corresponding to the input identification;

receiving one IP address corresponding to the transmitted one URI from the server apparatus;

accessing one of the plurality of the telephone apparatuses associated with the call destination for a call via the Internet, based on the one IP address;

receiving another identification input by the operator of the Internet telephone apparatus when the accessed one of the plurality of the telephone apparatuses is unavailable;

transmitting, to the server apparatus, another URI corresponding to the input another identification;

receiving another IP address corresponding to the another URI from the server apparatus; and accessing another telephone apparatus of the plurality of the telephone apparatuses associated with the call destination for a call via the Internet, based on the another IP address.

24. The method according to claim 19, wherein the server apparatus stores a NAPTR (Naming Authority Pointer) resource record in which an ENUM domain name corresponds to a plurality of URIs, the plurality of the URIs including a plurality of port numbers of a router, the router being connected to a plurality of telephone apparatuses associated with a call destination, the server apparatus storing a predetermined IP address corresponding to the plurality of the URIs, the method further comprising:

receiving the plurality of the URIs corresponding to the ENUM domain name from the server apparatus, each of the plurality of the URIs including one of the plurality of the port numbers, each of the plurality of the port numbers being associated with one of the telephone apparatuses;

transmitting one URI of the plurality of the URIs to the server apparatus;

receiving the predetermined IP address corresponding to the plurality of URIs from the server apparatus;

accessing one of the plurality of the telephone apparatuses associated with the call destination for a call via the Internet, based on the predetermined IP address and one port number included in the one URI;

accessing another telephone apparatus of the plurality of the telephone apparatuses associated with the call destination for a call via the Internet, based on the predetermined IP address and another port number included in another URI, when the accessed one of the plurality of the telephone apparatuses is unavailable.

25. An Internet telephone system comprising:
a server apparatus configured to store a NAPTR (Naming Authority Pointer) resource record in which an ENUM domain name corresponds to a plurality of URIs, and to store a plurality of IP addresses corresponding to the plurality of the URIs;
an Internet telephone apparatus comprising:
  a key pad configured to input a telephone number of a call destination, a plurality of telephone apparatuses being associated with the call destination;
  a controller configured to generate an ENUM domain name based on the input telephone number, to transmit the generated ENUM domain name to the server apparatus, to receive the plurality of the URIs corresponding to the ENUM domain name from the server apparatus, to transmit one URI of the plurality of the received URIs to the server apparatus, to receive one IP address corresponding to the transmitted one URI from the server apparatus, and to access one of the plurality of the telephone apparatuses associated with the call destination for a call via the Internet, based on the one IP address,
  the controller being, when the accessed one of the plurality of the telephone apparatuses is unavailable, further configured to transmit another URI of the plurality of the URIs to the server apparatus, to receive another IP address corresponding to the another URI from the server apparatus, and to automatically access another telephone apparatus of the plurality of the telephone apparatuses associated with the call destination for a call via the Internet, based on the another IP address.

26. The Internet telephone system according to claim 25, wherein
  the server apparatus stores the NAPTR (Naming Authority Pointer) resource record in which an ENUM domain name corresponds to a plurality of URIs and to a plurality of reference values, each of the plurality of the reference values indicating an order of priority for each of the plurality of the URIs corresponding to an ENUM server,
  the controller of the Internet telephone apparatus receives, from the server apparatus, the plurality of the URIs and the plurality of the reference values corresponding to the ENUM domain name, selects one URI from the plurality of the URIs based on the reference values, transmits the selected one URI to the server apparatus, receives one IP address corresponding to the selected one URI from the server apparatus, and accesses one of the plurality of the telephone apparatuses associated with the call destination for a call via the Internet, based on the one IP address,
  the controller further, when the accessed one of the plurality of the telephone apparatuses is unavailable, selects another URI from the plurality of URIs based on the reference values, transmits the selected another URI to the server apparatus, receives another IP address corresponding to the selected another URI from the server apparatus, and accesses another telephone apparatus of the plurality of the telephone apparatuses associated with the call destination for a call via the Internet, based on the another IP address.

27. The Internet telephone system according to claim 26, wherein, when more than two of the plurality of reference values have a same value, the controller selects the plurality of the URIS corresponding to the same value, transmits the selected plurality of the URIs to the server apparatus, receives a plurality of IP addresses corresponding to the selected plurality of the URIs from the server apparatus, and simultaneously accesses corresponding telephone apparatuses of the plurality of the telephone apparatuses associated with the call destination for a call via the Internet, based on the plurality of the IP addresses.

28. The Internet telephone system according to claim 25, wherein
  the server apparatus stores the NAPTR (Naming Authority Pointer) resource record in which an ENUM domain name corresponds to a plurality of URIs and to a plurality of communication types,
  the controller of the Internet telephone apparatus receives the plurality of the URIs and the plurality of the communication types corresponding to the ENUM domain name from the server apparatus, selects predetermined URIs from the plurality of the URIs based on the communication type, the communication type of the predetermined URIs corresponding to a Session Initiation Protocol, transmits one URI of the predetermined URIs to the server apparatus, receives one IP address corresponding to the transmitted one URI from the server apparatus, and accesses one of the plurality of the telephone apparatuses associated with the call destination for a call via the Internet, based on the one IP address,
  the controller further, when the accessed one of the telephone apparatus is unavailable, transmits another URI of the predetermined URIs to the server apparatus, to receive another IP address corresponding to the another URI from the server apparatus, and accesses another telephone apparatus of the plurality of the telephone apparatuses associated with the call destination for a call via the Internet, based on the another IP address.

29. The Internet telephone system according to claim 25, wherein
  the server apparatus stores the NAPTR (Naming Authority Pointer) resource record in which the ENUM domain name corresponds to the plurality of URIs and to a plurality of identifications, and
  the Internet telephone apparatus further comprising a display configured to display data, wherein
  the controller receives the plurality of the URIs and the plurality of the identifications corresponding to the ENUM domain name from the server apparatus, displays the plurality of the identifications, receives identification input by an operator of the Internet telephone apparatus, transmits one URI corresponding to the input identification to the server apparatus, receives one IP address corresponding to the transmitted one URI from the server apparatus, and accesses one of the plurality of the telephone apparatuses associated with the call destination for a call via the Internet, based on the one IP address,
  the controller further, when the accessed one of the plurality of the telephone apparatuses is unavailable, receives another identification input by the operator of the Internet telephone apparatus, transmits, to the server apparatus, another URI corresponding to the selected another identification, receives another IP address corresponding to the another URI from the server apparatus, and accesses another telephone apparatus of the plurality of the telephone apparatuses associated with the call destination for a call via the Internet, based on the another IP address.

30. The Internet telephone system according to claim 25, wherein the call destination comprises a plurality of telephone apparatuses, the plurality of the telephones being connected to the Internet via a router, the server apparatus stores the NAPTR (Naming Authority Pointer) resource record in which an ENUM domain name corresponds to a plurality of URIs, the plurality of the URIs including a plurality of port numbers of the router, and stores a predetermined IP address corresponding to the plurality of the URIs, the controller of the Internet telephone apparatus receives the plurality of the URIs corresponding to the ENUM domain name from the server apparatus, each of the plurality of the URIs including one of the plurality of the port numbers, each of the plurality of the port numbers being associated with one of the plurality of the telephone apparatuses, transmits one URI of the plurality of the URIs to the server apparatus, receives the predetermined IP address corresponding to the plurality of URIs from the server apparatus, and accesses one of the plurality of the telephone apparatuses associated with the call destination for a call via the Internet, based on the predetermined IP address and one port number included in the one URI, the controller further, when the accessed one of the plurality of the telephone apparatuses is unavailable, accesses another telephone apparatus of the plurality of the telephone apparatuses associated with the call destination for a call via the Internet, based on the predetermined IP address and another port number included in another URI.

* * * * *